United States Patent
Ono et al.

(10) Patent No.: US 9,971,438 B2
(45) Date of Patent: May 15, 2018

(54) PLANAR DEVICE, TOUCH SCREEN, AND LIQUID CRYSTAL DISPLAY

(71) Applicant: Mitsubishi Electric Corporation, Tokyo (JP)

(72) Inventors: Takeshi Ono, Tokyo (JP); Tatsuya Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 66 days.

(21) Appl. No.: 15/096,298

(22) Filed: Apr. 12, 2016

(65) Prior Publication Data

US 2016/0334910 A1    Nov. 17, 2016

(30) Foreign Application Priority Data

May 13, 2015 (JP) .................................. 2015-097822

(51) Int. Cl.
  *G06F 3/045* (2006.01)
  *G06F 3/041* (2006.01)
  *G06F 3/044* (2006.01)

(52) U.S. Cl.
  CPC ............ *G06F 3/0412* (2013.01); *G06F 3/044* (2013.01); *G06F 3/0416* (2013.01); *G06F 2203/04112* (2013.01)

(58) Field of Classification Search
  CPC ...... G06F 3/0412; G06F 3/0416; G06F 3/044; G06F 2203/04112
  See application file for complete search history.

(56) References Cited

U.S. PATENT DOCUMENTS

| | | | |
|---|---|---|---|
| 5,844,506 A | 12/1998 | Binstead | |
| 6,137,427 A | 10/2000 | Binstead | |
| 6,452,514 B1 | 9/2002 | Philipp | |
| RE40,867 E | 8/2009 | Binstead | |
| 8,269,744 B2 | 9/2012 | Agari et al. | |
| 8,390,598 B2 | 3/2013 | Agari et al. | |
| 2001/0020995 A1* | 9/2001 | Kim ..................... | G02F 1/1345 349/149 |
| 2010/0060602 A1* | 3/2010 | Agari ..................... | G06F 3/044 345/173 |
| 2012/0241408 A1* | 9/2012 | Misaki ................. | G02F 1/1333 216/20 |
| 2013/0242485 A1 | 9/2013 | Ohtani et al. | |

FOREIGN PATENT DOCUMENTS

| | | | |
|---|---|---|---|
| JP | 5-072563 A | 3/1993 | |
| JP | 9-511086 A | 11/1997 | |
| JP | 2003-526831 A | 9/2003 | |
| JP | 4869309 B2 | 11/2011 | |
| JP | 2012-103761 A | 5/2012 | |
| WO | 95/27334 A1 | 10/1995 | |
| WO | 00/044018 A1 | 7/2000 | |

* cited by examiner

*Primary Examiner* — Ilana Spar
*Assistant Examiner* — Brent D Castiaux
(74) *Attorney, Agent, or Firm* — Studebaker & Brackett PC

(57) ABSTRACT

A plurality of area lines extends in a first direction while being aligned in a second direction perpendicular to the first direction in a predetermined area. A plurality of lead-out lines electrically connects a plurality of terminal parts and the area lines to each other. Two or more of the lead-out lines include width adjusting lines determined to have widths differing from each other to make the respective resistance values of all of the lead-out lines lower than the resistance value of the area lines.

10 Claims, 19 Drawing Sheets

F I G. 3
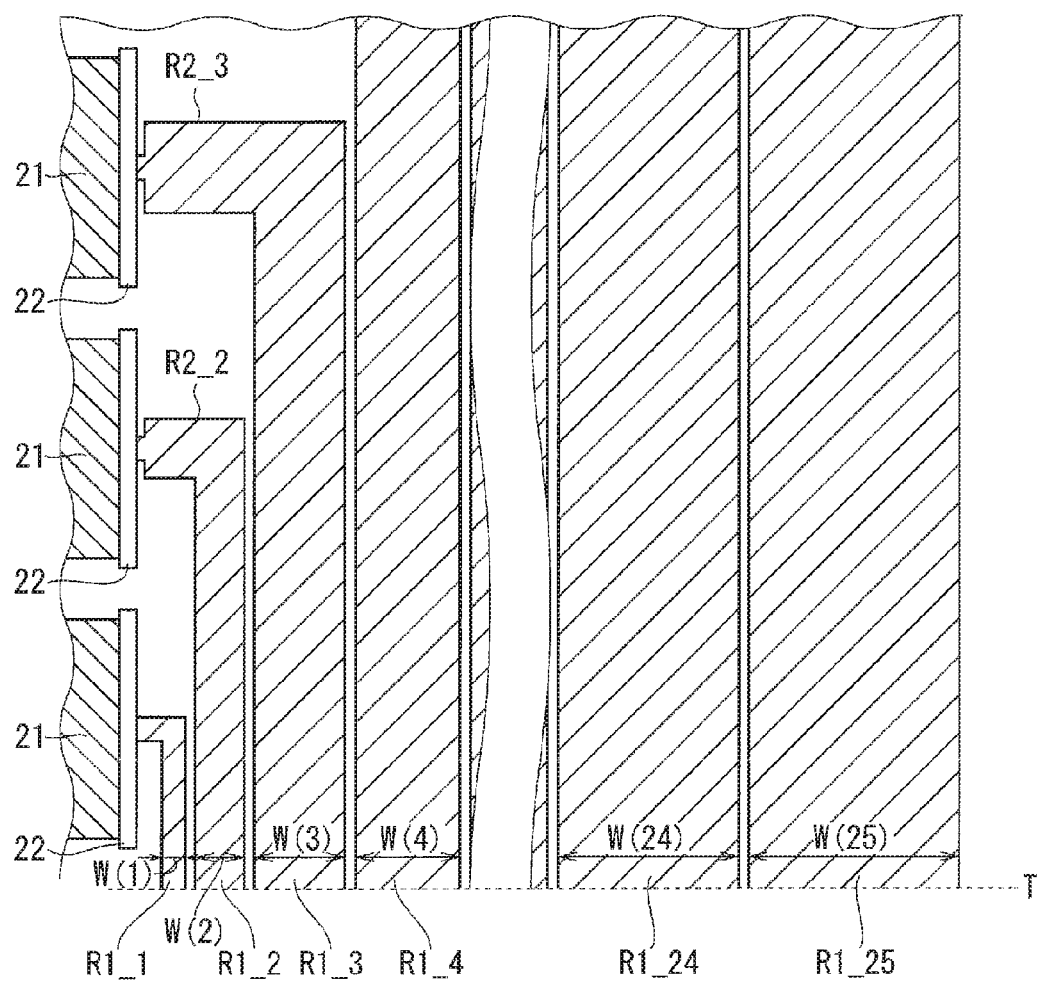

F I G. 4
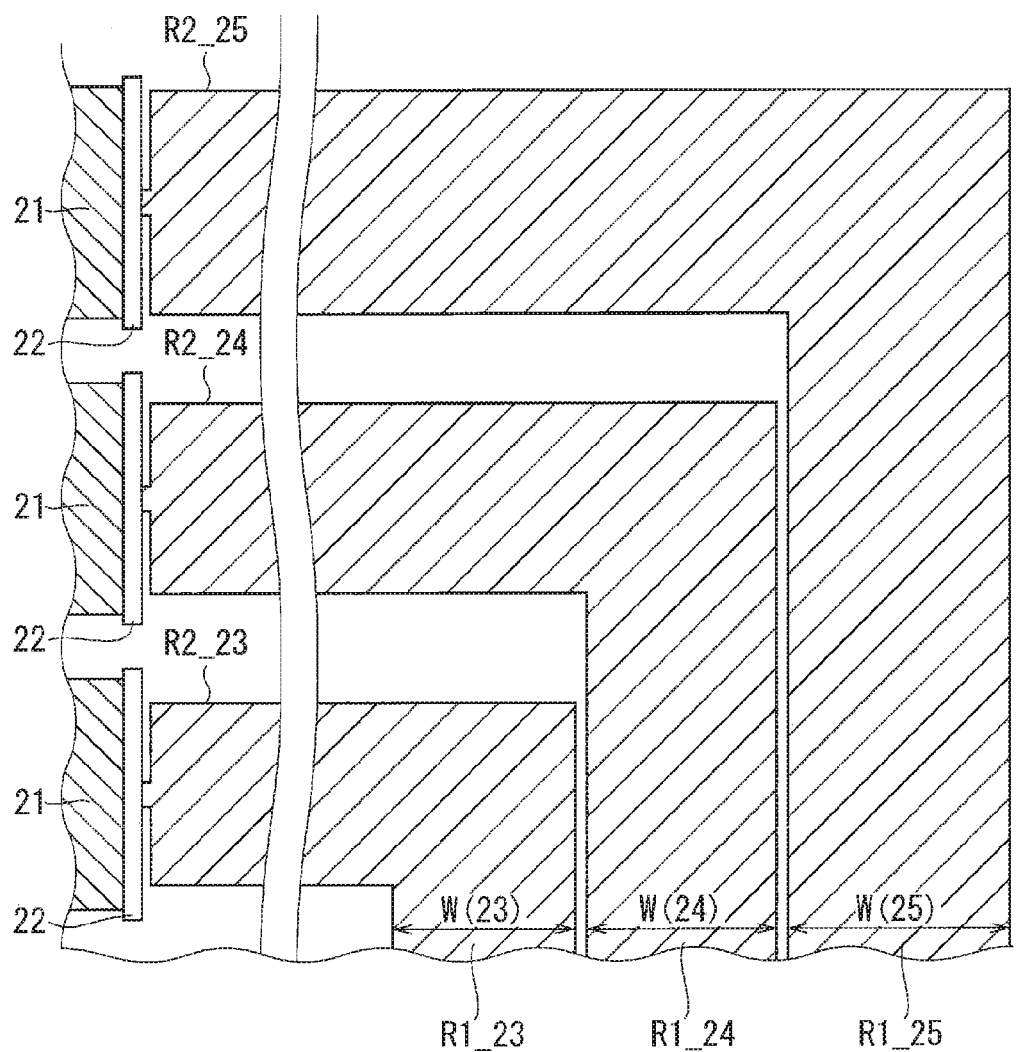

F I G. 5

| Rk | R1 | R2 | R3 | R4 | R5 | R6 | R7 | R8 | R9 | R10 | R11 | R12 | R13 | R14 | R15 | R16 | R17 | R18 | R19 | R20 | R21 | R22 | R23 | R24 | R25 |
|---|---|---|---|---|---|---|---|---|---|---|---|---|---|---|---|---|---|---|---|---|---|---|---|---|---|
| W(k) | 40 | 64 | 81 | 93 | 102 | 109 | 115 | 119 | 123 | 127 | 129 | 132 | 134 | 136 | 138 | 139 | 140 | 142 | 143 | 144 | 145 | 146 | 146 | 147 | 148 |

IN MICROMETERS

F I G. 7

| | R1 | R2 | R3 | R4 | R5 | R6 | R7 | R8 | R9 | R10 | R11 | R12 | R13 | R14 | R15 | R16 | R17 | R18 | R19 | R20 | R21 | R22 | R23 | R24 | R25 |
|---|---|---|---|---|---|---|---|---|---|---|---|---|---|---|---|---|---|---|---|---|---|---|---|---|---|
| FROM TERMINAL PART TO T | 600 | 588 | 576 | 564 | 552 | 540 | 528 | 516 | 504 | 492 | 480 | 468 | 456 | 444 | 432 | 420 | 408 | 396 | 384 | 372 | 360 | 348 | 336 | 324 | 312 |
| FROM T TO INPUT TERMINAL | 50 | 63 | 76 | 90 | 104 | 118 | 133 | 149 | 166 | 183 | 202 | 222 | 243 | 265 | 290 | 316 | 344 | 375 | 408 | 444 | 485 | 529 | 578 | 632 | 692 |
| TOTAL OF RESISTANCE VALUES | 650 | 651 | 652 | 654 | 656 | 658 | 661 | 665 | 670 | 675 | 682 | 690 | 699 | 709 | 722 | 736 | 752 | 771 | 792 | 816 | 845 | 876 | 914 | 956 | 1004 |

IN OHMS

F I G. 8

| | R1 | R2 | R3 | R4 | R5 | R6 | R7 | R8 | R9 | R10 | R11 | R12 | R13 | R14 | R15 | R16 | R17 | R18 | R19 | R20 | R21 | R22 | R23 | R24 | R25 |
|---|---|---|---|---|---|---|---|---|---|---|---|---|---|---|---|---|---|---|---|---|---|---|---|---|---|
| FROM TERMINAL PART TO T | 600 | 588 | 576 | 564 | 552 | 540 | 528 | 516 | 504 | 492 | 480 | 468 | 456 | 444 | 432 | 420 | 408 | 396 | 384 | 372 | 360 | 348 | 336 | 324 | 312 |
| FROM T TO INPUT TERMINAL | 50 | 62 | 75 | 86 | 99 | 110 | 122 | 134 | 146 | 158 | 170 | 182 | 194 | 207 | 219 | 231 | 242 | 254 | 266 | 278 | 290 | 302 | 314 | 326 | 338 |
| TOTAL OF RESISTANCE VALUES | 650 | 650 | 651 | 650 | 651 | 650 | 650 | 650 | 650 | 650 | 650 | 650 | 650 | 651 | 651 | 651 | 650 | 650 | 650 | 650 | 650 | 650 | 650 | 650 | 650 |

IN OHMS

F I G. 11

| Rk | R1 | R2 | R3 | R4 | R5 | R6 | R7 | R8 | R9 | R10 | R11 | R12 | R13 | R14 | R15 | R16 | R17 | R18 | R19 | R20 | R21 | R22 | R23 | R24 | R25 |
|---|---|---|---|---|---|---|---|---|---|---|---|---|---|---|---|---|---|---|---|---|---|---|---|---|---|
| W1(k) | 40 | 50 | 65 | 77 | 87 | 95 | 102 | 107 | 112 | 115 | 119 | 122 | 124 | 127 | 129 | 131 | 133 | 134 | 136 | 137 | 138 | 139 | 140 | 141 | 142 |
| W2(k) |  | 90 | 155 | 232 | 319 | 414 | 515 | 622 | 734 | 849 | 968 | 1090 | 1214 | 1341 | 1470 | 1601 | 1734 | 1869 | 2004 | 2142 | 2280 | 2419 | 2560 | 2701 | 2844 |

IN MICROMETERS

FIG. 12

| | R1 | R2 | R3 | R4 | R5 | R6 | R7 | R8 | R9 | R10 | R11 | R12 | R13 | R14 | R15 | R16 | R17 | R18 | R19 | R20 | R21 | R22 | R23 | R24 | R25 |
|---|---|---|---|---|---|---|---|---|---|---|---|---|---|---|---|---|---|---|---|---|---|---|---|---|---|
| FROM TERMINAL PART 10 T | 600 | 588 | 576 | 564 | 552 | 540 | 528 | 516 | 504 | 492 | 480 | 468 | 456 | 444 | 432 | 420 | 408 | 396 | 384 | 372 | 360 | 348 | 336 | 324 | 312 |
| FROM T TO INPUT TERMINAL | 50 | 62 | 75 | 86 | 99 | 110 | 122 | 134 | 146 | 158 | 170 | 182 | 194 | 207 | 219 | 231 | 242 | 254 | 266 | 278 | 290 | 302 | 314 | 326 | 338 |
| TOTAL OF RESISTANCE VALUES | 650 | 650 | 651 | 650 | 651 | 650 | 650 | 650 | 650 | 650 | 650 | 650 | 650 | 651 | 651 | 651 | 650 | 650 | 650 | 650 | 650 | 650 | 650 | 650 | 650 |

IN OHMS

F I G. 15
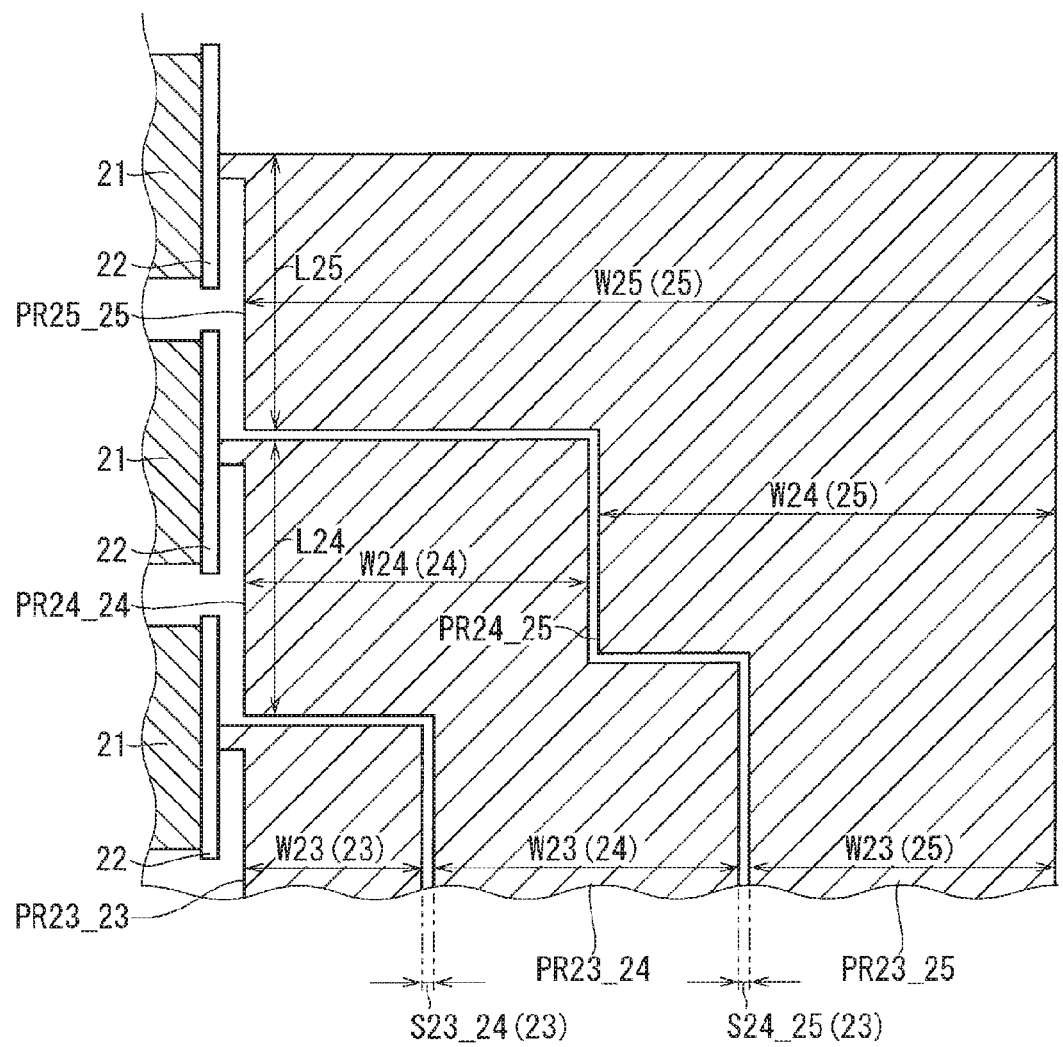

FIG. 16

IN MICROMETERS

| Rk | R1 | R2 | R3 | R4 | R5 | R6 | R7 | R8 | R9 | R10 | R11 | R12 | R13 | R14 | R15 | R16 | R17 | R18 | R19 | R20 | R21 | R22 | R23 | R24 | R25 |
|---|---|---|---|---|---|---|---|---|---|---|---|---|---|---|---|---|---|---|---|---|---|---|---|---|---|
| W1(k) | 40 | 64 | 78 | 89 | 96 | 102 | 105 | 107 | 109 | 109 | 109 | 108 | 107 | 106 | 104 | 101 | 99 | 96 | 93 | 90 | 87 | 83 | 80 | 76 | 72 |
| W2(k) | | 65 | 80 | 91 | 98 | 103 | 107 | 109 | 110 | 111 | 111 | 110 | 109 | 107 | 105 | 103 | 100 | 98 | 95 | 92 | 88 | 85 | 81 | 78 | 74 |
| W3(k) | | | 83 | 94 | 101 | 106 | 110 | 112 | 113 | 113 | 113 | 112 | 110 | 109 | 108 | 106 | 103 | 100 | 98 | 95 | 91 | 88 | 84 | 80 | 77 |
| W4(k) | | | | 97 | 104 | 110 | 113 | 116 | 117 | 117 | 117 | 115 | 114 | 114 | 112 | 110 | 107 | 104 | 101 | 98 | 95 | 91 | 88 | 84 | 81 |
| W5(k) | | | | | 109 | 115 | 118 | 120 | 122 | 122 | 122 | 121 | 120 | 118 | 116 | 114 | 112 | 109 | 106 | 103 | 100 | 96 | 92 | 89 | 85 |
| W6(k) | | | | | | 120 | 124 | 126 | 127 | 128 | 127 | 127 | 125 | 124 | 122 | 120 | 117 | 114 | 112 | 108 | 105 | 102 | 98 | 94 | 91 |
| W7(k) | | | | | | | 130 | 132 | 133 | 134 | 134 | 133 | 132 | 130 | 128 | 126 | 123 | 121 | 118 | 115 | 111 | 108 | 104 | 101 | 97 |
| W8(k) | | | | | | | | 139 | 141 | 141 | 141 | 140 | 139 | 137 | 135 | 133 | 131 | 128 | 125 | 122 | 119 | 115 | 111 | 108 | 104 |
| W9(k) | | | | | | | | | 149 | 149 | 149 | 148 | 147 | 146 | 144 | 141 | 139 | 136 | 133 | 130 | 127 | 123 | 120 | 116 | 112 |
| W10(k) | | | | | | | | | | 159 | 158 | 158 | 156 | 155 | 153 | 151 | 148 | 145 | 143 | 139 | 136 | 133 | 129 | 125 | 122 |
| W11(k) | | | | | | | | | | | 169 | 168 | 167 | 165 | 164 | 161 | 159 | 156 | 153 | 150 | 147 | 143 | 140 | 136 | 132 |
| W12(k) | | | | | | | | | | | | 180 | 179 | 178 | 176 | 173 | 171 | 168 | 165 | 162 | 159 | 155 | 152 | 148 | 144 |
| W13(k) | | | | | | | | | | | | | 193 | 191 | 189 | 187 | 185 | 182 | 179 | 176 | 173 | 169 | 165 | 162 | 158 |
| W14(k) | | | | | | | | | | | | | | 207 | 206 | 203 | 201 | 198 | 195 | 192 | 189 | 185 | 182 | 178 | 174 |
| W15(k) | | | | | | | | | | | | | | | 224 | 222 | 220 | 217 | 214 | 211 | 207 | 204 | 200 | 197 | 193 |
| W16(k) | | | | | | | | | | | | | | | | 245 | 242 | 239 | 236 | 233 | 230 | 226 | 223 | 219 | 216 |
| W17(k) | | | | | | | | | | | | | | | | | 269 | 266 | 264 | 260 | 257 | 254 | 250 | 246 | 243 |
| W18(k) | | | | | | | | | | | | | | | | | | 300 | 297 | 294 | 291 | 287 | 284 | 280 | 276 |
| W19(k) | | | | | | | | | | | | | | | | | | | 340 | 337 | 334 | 330 | 327 | 323 | 319 |
| W20(k) | | | | | | | | | | | | | | | | | | | | 394 | 390 | 387 | 383 | 380 | 376 |
| W21(k) | | | | | | | | | | | | | | | | | | | | | 469 | 466 | 462 | 458 | 455 |
| W22(k) | | | | | | | | | | | | | | | | | | | | | | 583 | 579 | 576 | 572 |
| W23(k) | | | | | | | | | | | | | | | | | | | | | | | 773 | 770 | 766 |
| W24(k) | | | | | | | | | | | | | | | | | | | | | | | | 1157 | 1153 |
| W25(k) | | | | | | | | | | | | | | | | | | | | | | | | | 2310 |
| AVERAGE | 40 | 64 | 80 | 93 | 102 | 109 | 115 | 120 | 124 | 128 | 132 | 135 | 139 | 142 | 146 | 150 | 154 | 160 | 167 | 175 | 186 | 201 | 222 | 258 | 336 |

F I G. 17

| | R1 | R2 | R3 | R4 | R5 | R6 | R7 | R8 | R9 | R10 | R11 | R12 | R13 | R14 | R15 | R16 | R17 | R18 | R19 | R20 | R21 | R22 | R23 | R24 | R25 |
|---|---|---|---|---|---|---|---|---|---|---|---|---|---|---|---|---|---|---|---|---|---|---|---|---|---|
| FROM TERMINAL PART TO T | 600 | 588 | 576 | 564 | 552 | 540 | 528 | 516 | 504 | 492 | 480 | 468 | 456 | 444 | 432 | 420 | 408 | 336 | 384 | 372 | 360 | 348 | 336 | 324 | 312 |
| FROM T TO INPUT TERMINAL | 50 | 62 | 75 | 86 | 99 | 110 | 122 | 134 | 146 | 158 | 170 | 182 | 194 | 207 | 219 | 231 | 242 | 254 | 266 | 278 | 290 | 302 | 314 | 326 | 338 |
| TOTAL OF RESISTANCE VALUES | 650 | 650 | 651 | 650 | 651 | 650 | 650 | 650 | 650 | 650 | 650 | 650 | 650 | 651 | 651 | 651 | 650 | 650 | 650 | 650 | 650 | 650 | 650 | 650 | 650 |

IN OHMS

PLANAR DEVICE, TOUCH SCREEN, AND LIQUID CRYSTAL DISPLAY

FIELD OF THE INVENTION

The present invention relates to a planar device having a line placed along a plane, a touch screen, and a liquid crystal display.

BACKGROUND ART

A touch panel as one type of a planar device having a line placed along a plane is to detect a touch for example with a finger to specify the coordinates of the position of the touch. The touch panel has gained attention as one of excellent user interfaces. The touch panel which is currently commercially available includes various types of touch panels including a resistive touch panel and a capacitive touch panel. The touch panel is generally formed of a touch screen including a built-in touch sensor and a detector that specifies the coordinates of a touched position based on a signal from the touch screen.

A projected capacitive touch panel is one type of the capacitive touch panel (see Japanese Patent Application Laid-Open No. 2012-103761, for example). The projected capacitive touch panel allows detection of a touch, even if a front surface of a touch screen with a built-in touch sensor is covered with a protection plate such as a glass plate of a thickness of several millimeters. The touch panel of this system has excellent robustness as it allows installation of the protection plate on the front surface. Additionally, the touch panel of this system allows detection of a touch even with a gloved finger. Further, the touch panel of this system has a long life as it does not have a movable part to be deformed mechanically.

For example, the projected capacitive touch panel includes the following elements as detector lines for detecting a capacitance: a first series of conducting elements formed on a thin dielectric film and a second series of conducting elements formed over the first series of conducting elements with intervention of an insulating film. Each conducting element is not electrically connected to a different conducting element. These conducting elements cross each other three-dimensionally at several points. A capacitance formed between an indicator such as a finger and each of the first series of conducting elements and the second series of conducting elements is detected using a detector circuit, thereby specifying the coordinates of a position touched with the finger. This detection system is generally called a self capacitance detection system (see Japanese Unexamined Patent Application Publication (Translation of PCT Application) No. 9-511086 (1997), for example).

According to another example of the detection system of specifying the coordinates of a touched position, change in an electric field between a plurality of row-direction lines extending in a row direction and a plurality of column-direction lines extending in a column direction, specifically, change in a mutual capacitance is detected. This detection system is generally called a mutual capacitance detection system (see Japanese Unexamined Patent Application Publication (Translation of PCT Application) No. 2003-526831, for example).

In either structure of the aforementioned self capacitance system and mutual capacitance system, in the presence of a touch with an indicator such as a finger in one of planar regions (detector cells) in a lattice pattern formed by partitioning using the row-direction lines and the column-direction lines, the position coordinates of the touch are generally specified by a method using a balance between a value detected in a sensor block and a value detected by a detector cell near the sensor block.

Forming a mesh wire made of low-resistance metal instead of a transparent conductive film made of a material such as indium tin oxide (ITO) has recently been suggested as a technique of increasing detection speed or increasing the size of a touch screen (see Japanese Patent No. 4869309, for example).

A display device, as a different type of the planar device having a line placed along a plane, has been used to realize reduction in power consumption and reduction in the thickness of the device. One example of this display device includes an active matrix thin film transistor (hereinafter called a "TFT") used as a switching element. Such a display device has been required to achieve further reduction in resistance of a lead-out line, etc. in response to larger size, higher rate, or higher definition of a screen.

However, even if a sensor line (detector line) is formed by using a mesh wire made of low-resistance metal as in Japanese Patent No. 4869309, increasing the size of a touch screen still increases the length of a lead-out line extending from a signal input terminal part of the touch screen to the detector line, particularly the length of the lead-out line in an external area. This increases wiring resistance of the lead-out line in this area. Increase in the resistance of the lead-out line increases the probability of the occurrence of breakdown in an insulating film forming the sensor line due to electrostatic discharge (ESD), causing a problem in that touch function might be lost easily.

In a display device, increase in the size of a TFT substrate on which a TFT is formed also increases resistance of an external lead-out line. This increases the probability of the occurrence of breakdown in an insulating film between a gate line and a source line connected to this lead-out line, causing a problem in that a line defect might be caused easily on the display device.

SUMMARY OF THE INVENTION

The present invention has been made in view of the aforementioned problems. It is an object of the present invention to provide a technique capable of reducing the probability of the occurrence of breakdown due to electrostatic discharge.

The present invention is intended for a planar device having a line placed along a plane. The planar device includes a plurality of area lines, a plurality of terminal parts, and a plurality of lead-out lines. The area lines extend in a first direction and are aligned in a second direction perpendicular to the first direction in a predetermined area. The terminal parts are provided outside the predetermined area. The lead-out lines electrically connect the terminal parts and the area lines to each other. Two or more of the lead-out lines include width adjusting lines determined to have widths differing from each other to make the respective resistance values of all of the lead-out lines lower than the resistance value of the area lines.

The probability of the occurrence of breakdown due to electrostatic discharge can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2 to 4 are plan views each showing the structure of the touch screen according to the first preferred embodiment;

FIG. 5 shows the width of a lead-out line of the touch screen according to the first preferred embodiment;

FIG. 7 shows a result of simulation about a resistance value in a related touch screen;

FIG. 8 shows a result of simulation about a resistance value in the touch screen according to the first preferred embodiment;

FIG. 11 shows the width of a lead-out line of the touch screen according to the second preferred embodiment;

FIG. 12 shows a result of simulation about a resistance value in the touch screen according to the second preferred embodiment;

FIGS. 13 to 15 are plan views each showing the structure of a touch screen according to a third preferred embodiment;

FIG. 16 shows the width of a lead-out line of the touch screen according to the third preferred embodiment;

FIG. 17 shows a result of simulation about a resistance value in the touch screen according to the third preferred embodiment;

DESCRIPTION OF THE PREFERRED EMBODIMENTS

<First Preferred Embodiment>

In a first preferred embodiment of the present invention described below, a planar device having a line placed along a plane is applied to a touch screen. The touch screen of the first preferred embodiment described below is a projected capacitive touch panel. However, the type of the touch screen of the first preferred embodiment is not the only projected capacitive type.

Figure 1:
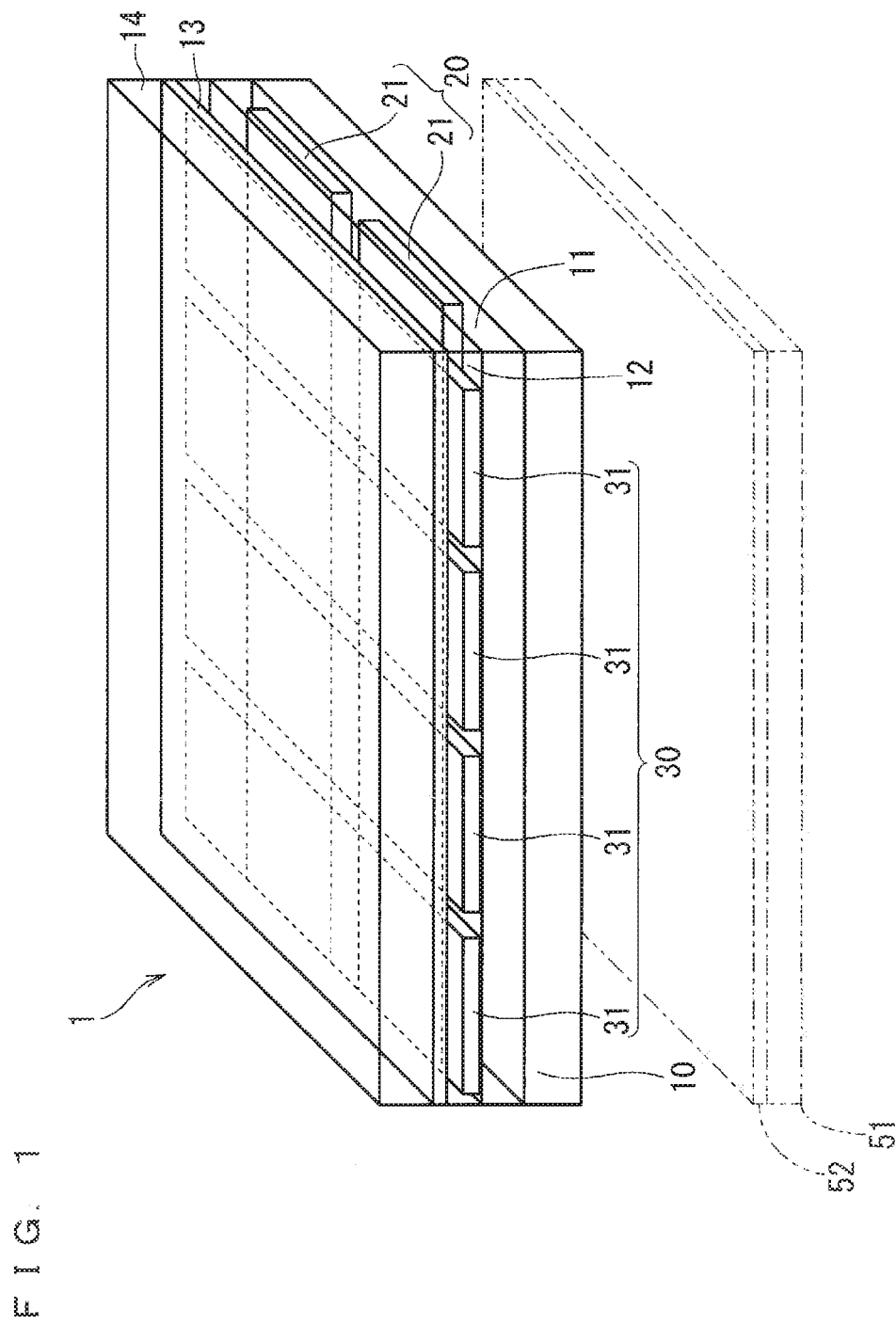
FIG. 1 is a perspective view showing a layer structure of a touch screen according to a first preferred embodiment.

FIG. 1 is a perspective view showing a layer structure of a touch screen 1 according to the first preferred embodiment. Referring to FIG. 1, the bottom layer of the touch screen 1 is formed of a transparent substrate 10 made of a transparent glass material or transparent resin. A lower electrode 20 is provided on the transparent substrate 10. An interlayer insulating film 11 is provided so as to cover the lower electrode 20. The interlayer insulating film 11 is a transparent insulating film such as a silicon nitride film or a silicon oxide film. An upper electrode 30 is provided on the upper surface of the interlayer insulating film 11.

A protection film 12 is provided on the upper surface of the interlayer insulating film 11 as to cover the upper electrode 30. Like the interlayer insulating film 11, the protection film 12 is an insulating film having light-transmitting properties such as a silicon nitride film. A polarization plate 13 is bonded to the upper surface of the protection film 12. The polarization plate 13 is prepared for a liquid crystal display to which the touch screen 1 is attached. A transparent substrate 14, made of a transparent glass material or transparent resin, for example, is stuck (adhered) to the upper surface of the polarization plate 13 for protection of the touch screen 1.

The lower electrode 20 includes a plurality of row-direction lines 21 made of a transparent wiring material such as indium tin oxide (ITO) or a metal wiring material such as aluminum or copper. Like the lower electrode 20, the upper electrode 30 includes a plurality of column-direction lines 31 made of a transparent wiring material such as ITO or a metal wiring material such as aluminum or copper.

In the first preferred embodiment, a multilayer structure including an aluminum-based alloy layer and a nitride layer of the alloy is applied to each of the column-direction lines 31 and each of the row-direction lines 21. This can reduce wiring resistance and reduce the reflectance of light in a detectable area. In the first preferred embodiment, the column-direction lines 31 are placed over the row-direction lines 21. These relative positions may be reversed to place the row-direction lines 21 over the column-direction lines 31. Regarding the material for the column-direction lines 31 and that for the row-direction lines 21, both of the lines 31 and 21 are formed of the multilayer structure including the aluminum-based alloy layer and the nitride layer of the alloy. However, both of the lines 31 and 21 are not required to be made of the same material. For example, the column-direction lines 31 may have a multilayer structure including an aluminum-based alloy layer and a nitride layer of the alloy while the row-direction lines 21 may be made of a transparent wiring material such as ITO.

In the first preferred embodiment, the column-direction lines 31 are placed over the row-direction lines 21. Alternatively, the column-direction lines 31 and the row-direction lines 21 may be placed in the same layer. In this case, the interlayer insulating film 11 may be provided between the column-direction lines 31 and the row-direction lines 21 only in a portion where the lines 31 and the lines 21 overlap each other in a plan view to electrically isolate the lines 31 and the lines 21 in this portion from each other.

A user operates the touch screen 1 by touching the transparent substrate 14 forming a surface of the touch screen 1 with an indicator such as a finger. If the indicator touches the transparent substrate 14, capacitive coupling (touch capacitance) is generated between the indicator and at least one of the row-direction lines 21 and at least one of the column-direction lines 31 below the transparent substrate 14. According to the mutual capacitance system, based on change in a mutual capacitance between the row-direction lines 21 and the column-direction lines 31 occurring in response to generation of the touch capacitance, a position in a detectable area touched with the indicator is specified.

FIG. 1 shows a display element 51 and an adhesive agent 52 indicated by phantom lines (alternate long and two short dashes lines) in addition to the touch screen 1. For example, a liquid crystal display element or a display panel such as a liquid crystal display (LCD) panel is applied to the display element 51.

Figure 2:
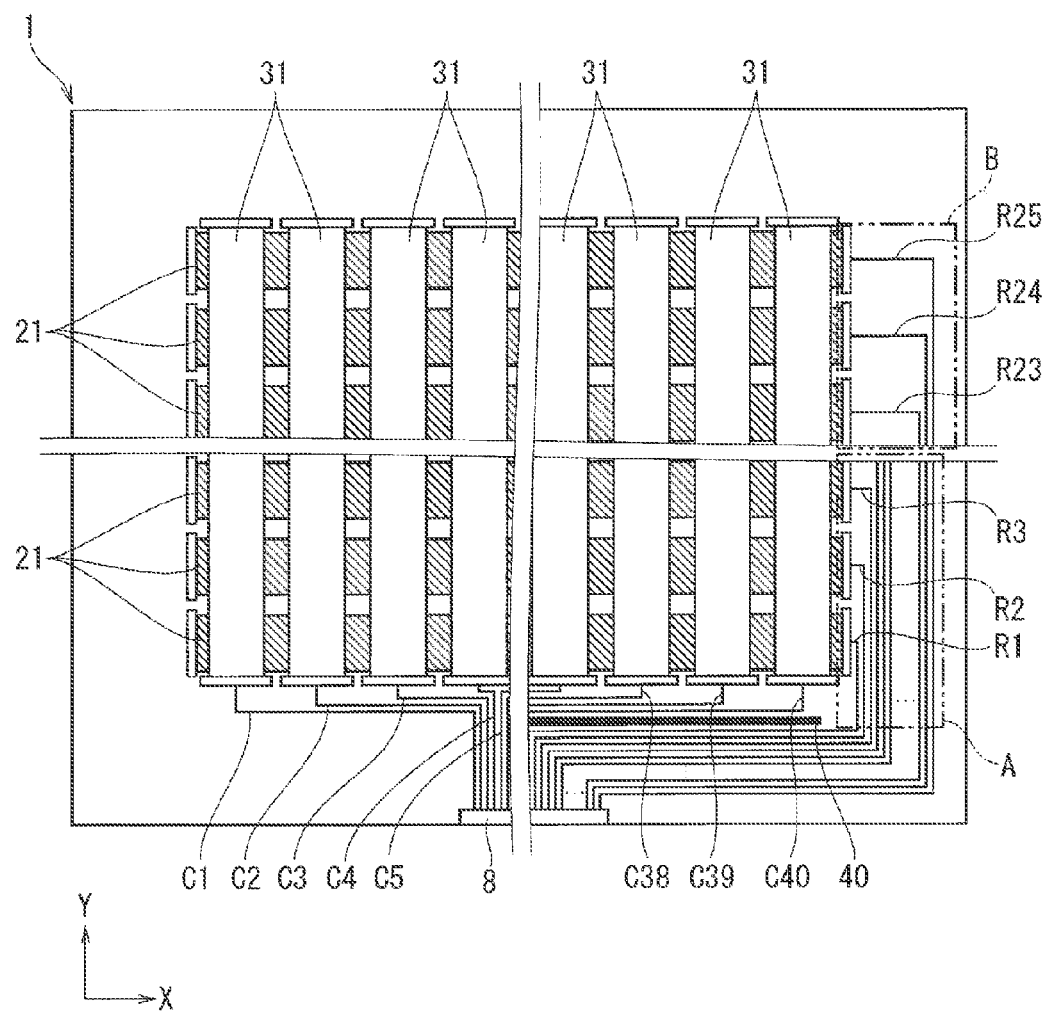

FIG. 2 is a plan view showing the structure of the touch screen 1 according to the first preferred embodiment. A detectable area of the touch screen 1 is one type of an active area (predetermined area) having at least a capacitive load and a resistive load. The detectable area is a matrix area formed of a plurality of row-direction lines 21 extending in the row direction (X direction or horizontal direction) while being aligned in the column direction (Y direction or vertical direction) and a plurality of column-direction lines 31 extending in the column direction while being aligned in the row direction overlapping each other in a plan view. In the below, the row direction (X direction or horizontal direction) corresponds to a first direction, the column direction (Y direction or vertical direction) perpendicular to the row direction corresponds to a second direction, and the row-direction lines 21 correspond to a plurality of area lines (a plurality of sensor lines). However, these are one of examples of definitions of the directions and the area lines.

The touch screen 1 of FIG. 2 includes a plurality of terminal parts 8 for connection to external lines (not shown in the drawings), lead-out lines R1 to R25, and lead-out lines C1 to C40. Specifically, in the first preferred embodiment, a plurality of lead-out lines corresponds to the first to $n^{th}$ lead-out lines, where n is 25. However, the number of lead-out lines is certainly not limited to 25.

The terminal parts 8 are provided outside the detectable area. The lead-out lines R1 to R25 connect the terminal parts 8 and the row-direction lines 21 to each other electrically. The respective total lengths of the lead-out lines R1 to R25 are increased in this order. The lead-out lines C1 to C40 connect the terminal parts 8 and the column-direction lines 31 to each other electrically.

The lead-out lines R1 to R25 and the lead-out lines C1 to C40 are placed along the outer periphery of the detectable area. A shield line 40 receiving a reference potential such as a ground potential is placed between the lead-out line C40 for the column-direction line 31 and the lead-out line R1 for the row-direction line 21. Placing the shield line 40 can reduce a cross-capacitance between the lead-out lines C40 and R1. This can make it unlikely that a touch with an indicator will be detected erroneously.

The structure of each of the lead-out lines R1 to R25 is described in detail next using FIGS. 3 and 4. FIG. 3 is a plan view showing a region A shown in FIG. 2 and its neighboring region in an enlarged manner where the lead-out lines R1 to R3 are connected to respective input terminals 22 of the row-direction lines 21. FIG. 4 is a plan view showing a region B shown in FIG. 2 and its neighboring region in an enlarged manner where the lead-out lines R23 to R25 are connected to respective input terminals 22 of the row-direction lines 21. Referring to FIG. 3, a dashed line shows a boundary part T where the lead-out lines R1 to R25 extending in the column direction from the terminal part 8 start to extend in the row direction in order from the lead-out line R1.

Two or more of the lead-out lines R1 to R25 include width adjusting lines determined (adjusted) to have widths differing from each other. According to an example of the width adjusting line of the first preferred embodiment, the lead-out lines R1 to R25 include first to $25^{th}$ width adjusting lines respectively.

The first to $25^{th}$ width adjusting lines include column-direction extending lines R1_1 to R1_25 (first to $25^{th}$ second-direction extending lines) respectively shown in FIGS. 3 and 4. The column-direction extending lines R1_1 to R1_25 extend in the column direction and are aligned in the row direction in order of increasing distance from the detectable area. As shown in FIGS. 3 and 4, the column-direction extending lines R1_1 to R1_25 have lengths W(1) to W(25) in the row direction respectively.

The second to $25^{th}$ width adjusting lines except the first width adjusting line further include projecting lines R2_2 to R2_25 (second to $25^{th}$ projecting lines) respectively shown in FIGS. 3 and 4. The projecting line R2_2 electrically connects a corresponding one of the row-direction lines 21 and the column-direction extending line R1_2 and projects further toward the detectable area in the row direction than the connected column-direction extending line R1_2. Likewise, the projecting lines R2_3 to R2_25 electrically connect corresponding ones of the row-direction lines 21 and the column-direction extending lines R1_3 to R1_25 respectively and project further toward the detectable area in the row direction than the connected column-direction extending lines R1_3 to R1_25 respectively. The projecting lines R2_2 to R2_25 have lengths in the column direction respectively same as the lengths W(2) to W(25) of the column-direction extending lines R1_2 to R1_25 in the row direction respectively.

In the first preferred embodiment, by determining (adjusting) the respective widths of the width adjusting lines in the aforementioned way, the respective widths W(1) to W(25) of the first to $25^{th}$ width adjusting lines are increased in this order. Specifically, the following relationship is established: $W(1) \leq W(2) \leq \ldots \leq W(25)$.

FIG. 5 shows the values of the respective lengths W(1) to W(25) of the first to $25^{th}$ width adjusting lines. These values are expressed in micrometers. As shown in FIG. 5, the respective widths W(1) to W(25) of the first to $25^{th}$ width adjusting lines are increased in this order. As a result of the presence of the first to $25^{th}$ width adjusting lines determined (adjusted) in this way, the respective resistance values of all the lead-out lines R1 to R25 become lower than the resistance value of the row-direction lines 21, as will be described in detail later.

Figure 6:
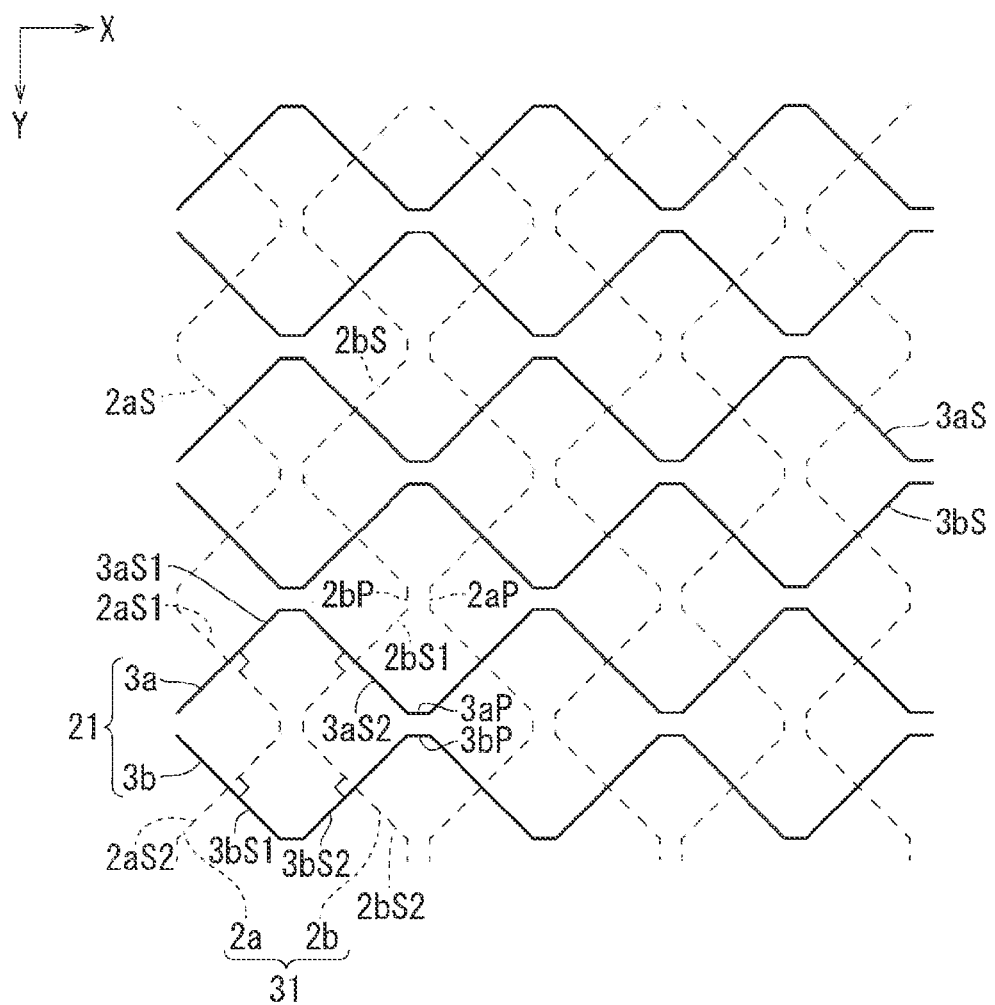
FIG. 6 is a plan view showing the structure of a row-direction line and that of a column-direction line according to the first preferred embodiment.

The structure of the row-direction lines 21 and that of the column-direction lines 31 are described in detail next using FIG. 6. As illustrated in FIG. 6, each column-direction line 31 is formed of: (1) a first metal line 2a and (2) a second metal line 2b in a pair. The first metal line 2a has a zigzag pattern including first slanting sections 2aS and first parallel sections 2aP appearing repeatedly in the zigzag pattern in the column direction Y. The first slanting sections 2aS slant obliquely from the column direction Y at an angle 45°. The first parallel sections 2aP extend parallel to the column direction Y and continuously with the first slanting sections 2aS. The first and second metal lines 2a and 2b are linearly symmetric with respect to the column direction Y.

Likewise, each row-direction line 21 is formed of: (3) a third metal line 3a and (4) a fourth metal line 3b in a pair. The third metal line 3a has a zigzag pattern including second slanting sections 3aS and second parallel sections 3aP appearing repeatedly in the zigzag pattern in the row direction X. The second slanting sections 3aS slant obliquely from the row direction X at an angle 45°. The second parallel sections 3aP extend parallel to the row direction X and continuously with the second slanting sections 3aS. The third and fourth metal lines 3a and 3b are linearly symmetric with respect to the row direction X.

Further, the following position relationship is established in each area where one detector line arbitrarily selected from the column-direction lines 31 and one detector line arbitrarily selected from the row-direction lines 21 are crossed each other three-dimensionally.

A slanting section 2aS1 as one of two first slanting sections 2aS of the first metal line 2a belonging to one area is perpendicular three-dimensionally at its midpoint (center) to a slanting section 3aS1 as one of two second slanting sections 3aS of the third metal line 3a belonging to this area. Further, a slanting section 2aS2 as the other of the two first slanting sections 2aS of the first metal line 2a belonging to one area is perpendicular three-dimensionally at its midpoint (center) to a slanting section 3bS1 as one of two second slanting sections 3bS of the fourth metal line 3b belonging to this area.

A slanting section 2bS1 as one of two first slanting sections 2bS of the second metal line 2b belonging to one area is perpendicular three-dimensionally at its midpoint (center) to a slanting section 3aS2 as the other of the two second slanting sections 3aS of the third metal line 3a belonging to this area. Additionally, a slanting section 2bS2 as the other of the two first slanting sections 2bS of the second metal line 2b belonging to one area is perpendicular three-dimensionally at its midpoint (center) to a slanting section 3bS2 as the other of the two second slanting sections 3bS of the fourth metal line 3b belonging to this area. By determining the aforementioned relationship between the slanting sections to be perpendicular to each other, the dimension of the parallel section 2aP and that of a parallel section 2bP in the column direction Y, and the dimension of the parallel section 3aP and that of a parallel section 3bP in the row direction X are minimized.

The structure of the first preferred embodiment shown in FIG. 6, specifically, the structure applying metal lines in a mesh pattern to the row-direction lines 21 and the column-direction lines 31 can minimize the value of a parasitic capacitance generated between the row-direction lines 21 and the column-direction lines 31. Additionally, this structure can reduce a total area in a plan view where the row-direction lines 21 and the column-direction lines 31 do not exist, compared to the case not applying this structure. As a result, a touch capacitance including a capacitance formed between an indicator such as a finger and each of the row-direction lines 21 and a capacitance formed between the indicator and each of the column-direction lines 31 can be detected uniformly in each area.

In the first preferred embodiment, the metal lines in a mesh pattern applied to the row-direction lines 21 and the column-direction lines 31 have a width 3 μm. The resistance value of the row-direction lines 21 of this structure was calculated by simulation and determined to be 780Ω.

The row-direction lines 21 and the column-direction lines 31 can be made of a transparent conductive material such as ITO or graphene or a metal material such as aluminum, chromium, copper, or silver. Alternatively, the row-direction lines 21 and the column-direction lines 31 may have a multilayer structure including a layer of an alloy such as aluminum, chromium, copper, or silver, and a layer for example made of aluminum nitride formed on the layer of the alloy. The width of the conductive line, a gap between the meshes, and the resistance value are not limited to those described above but can be changed, if appropriate, in a manner that depends on the purpose of use of the touch screen 1, for example.

FIG. 7 shows a result of simulation about the respective resistance values of the lead-out lines R1 to R25 in a touch screen related to the first preferred embodiment (hereinafter called a "related touch screen"). FIG. 8 shows a result of simulation about the respective resistance values of the lead-out lines R1 to R25 in the touch screen 1 of the first preferred embodiment. In FIGS. 7 and 8, a resistance value in a range from the terminal part 8 to the boundary part T and a resistance value in a range from the boundary part T to the input terminal 22 of the row-direction line 21 (resistance value of the width adjusting line) are given separately. These values are expressed in ohms.

In the related touch screen, the respective widths of all parts corresponding to the first to $25^{th}$ width adjusting lines are 40 μm. As a result, the respective resistance values of the lead-out lines R1 to R25 are increased in this order in response to the respective entire lengths of the lead-out lines R1 to R25, as shown in FIG. 7. The respective resistance values of the lead-out lines R19 to R25 become larger than the resistance value of the row-direction lines 21.

In contrast, in the touch screen 1 of the first preferred embodiment, the widths shown in FIG. 5 are applied to the first to $25^{th}$ width adjusting lines. As a result, the respective resistance values of all the lead-out lines R1 to R25 become lower than 780Ω corresponding to the resistance value of the row-direction lines 21.

<Effect>

To confirm the effect of the touch screen 1 according to the first preferred embodiment, the touch screen 1 of the first preferred embodiment and the related touch screen each having the transparent substrate 14 made of a glass material of a thickness of 1.0 mm were prepared and these touch screens were subjected to an electrostatic discharge test. The discharge test was conducted with a discharge capacitor set at 300 pF and a discharge resistance set at 330Ω. As a result of the test, breakdown was recognized in a place near a connection between the lead-out line R25 and the input terminal 22 of the row-direction line 21 in the related touch screen in the presence of discharge of about 15 kV. In contrast, in the touch screen 1 of the first preferred embodiment, breakdown was not recognized even in the presence of discharge exceeding 15 kV.

As described above, according to the first preferred embodiment, breakdown is unlikely to be caused by electrostatic discharge for example from a conductor on a touch panel, making it possible to achieve a highly-reliable touch screen. The touch screen 1 of the first preferred embodiment and the related touch screen were connected to a detector controller for a touch panel. Then, a response time after touch of the transparent substrate 14 with an indicator and until coordinate output was measured. A result of the measurement shows that a response speed of the touch screen 1 according to the first preferred embodiment is about 65% of a response speed of the related touch screen. This shows that the first preferred embodiment can be expected to increase a response speed of a touch panel. Additionally, not by increasing the respective widths of all width adjusting lines uniformly but by increasing the width of a width adjusting line of a lead-out line having a relatively large resistance value, an area for placement of the entire lead-out lines can be reduced. In this way, the touch screen 1 is allowed to narrow a frame of a touch panel.

In the description given above, the second to $25^{th}$ width adjusting lines targeted for width adjustment include not only the column-direction extending lines R1_2 to R1_25 but also the projecting lines R2_2 to R2_25 respectively and the respective widths of all of these lines are adjusted. Alternatively, the second to $25^{th}$ width adjusting lines may include only the column-direction extending lines R1_2 to R1_25 respectively and only the respective widths of these lines may be adjusted. This structure can still achieve effect comparable to the aforementioned effect.

<Second Preferred Embodiment>

As shown in FIGS. 3 and 4, in the first preferred embodiment, a gap in the row direction between the column-direction extending lines R1_1 to R1_25 is relatively small, whereas a gap in the column direction between the projecting lines R2_2 to R2_25 is relatively large. In a second preferred embodiment of the present invention, the respective lengths in the column direction of the projecting lines R2_2 to R2_25 are increased, thereby forming a relatively small gap in the column direction between the projecting lines R2_2 to R2_25. The overall structure of a touch screen 1 according to the second preferred embodiment and that of lead-out lines including the lead-out lines R1 to R25 are the same as those of the first preferred embodiment shown in FIGS. 1 and 2, so that they will not be described here.

Figure 9:
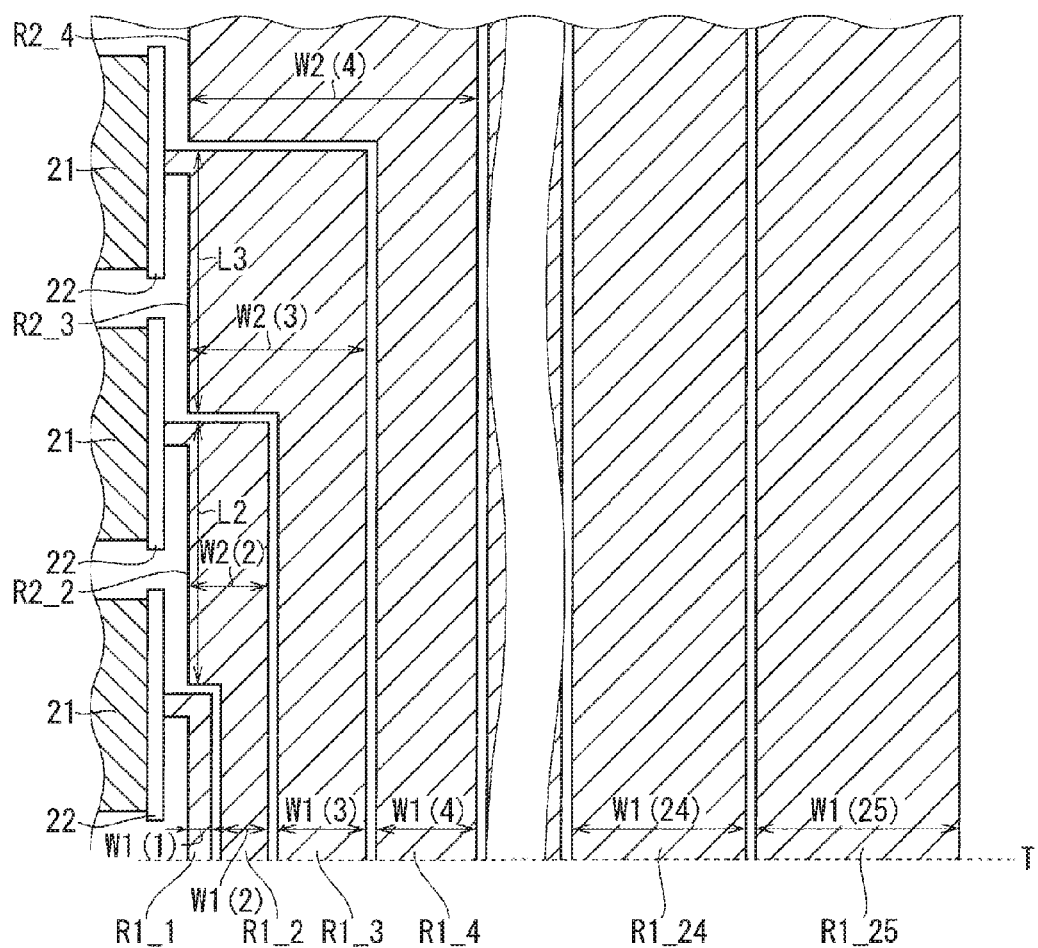
FIGS. 9 and 10 are plan views each showing the structure of a touch screen according to a second preferred embodiment.
Figure 10:
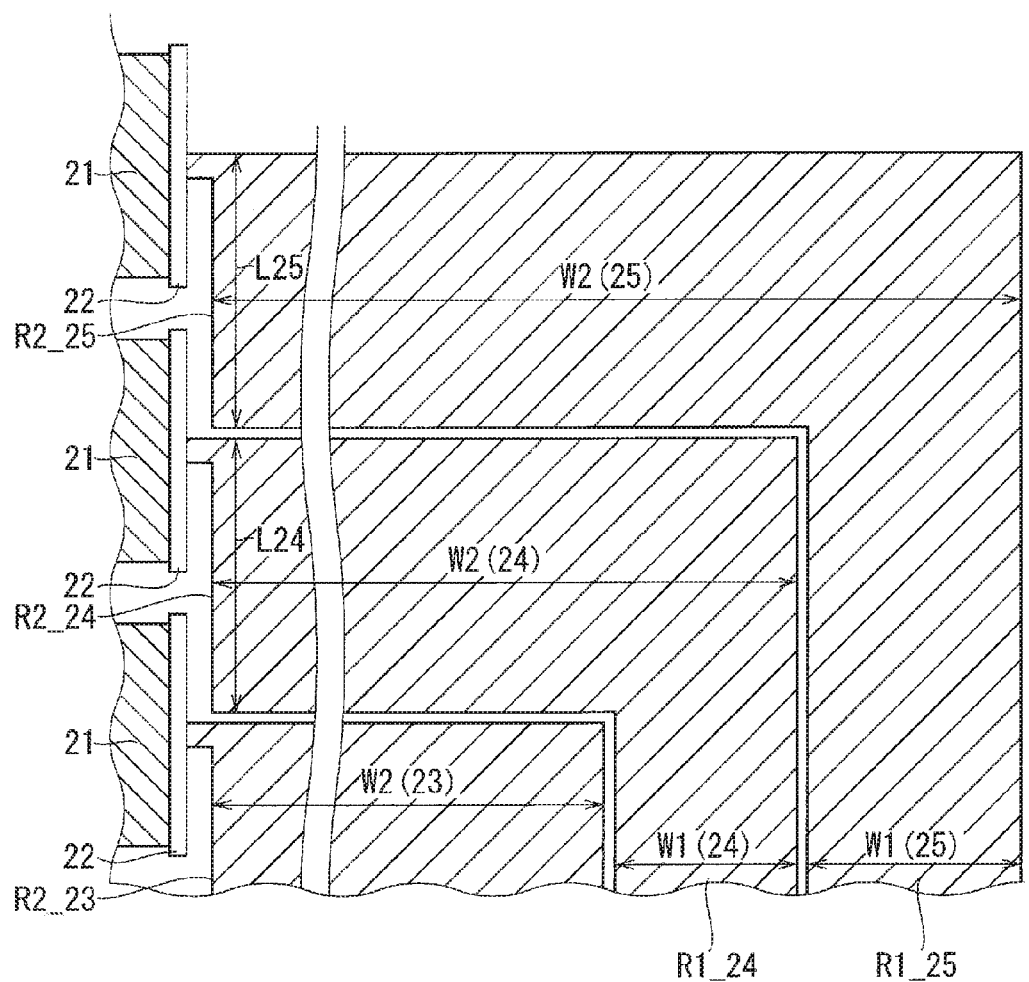

The structure of each of the lead-out lines R1 to R25 is described in detail using FIGS. 9 and 10. FIG. 9 is a plan view showing a region A shown in FIG. 2 and its neighboring region in an enlarged manner where the lead-out lines R1 to R3 are connected to the respective input terminals 22 of the row-direction lines 21. FIG. 10 is a plan view showing a region B shown in FIG. 2 and its neighboring region in an enlarged manner where the lead-out lines R23 to R25 are connected to the respective input terminals 22 of the row-direction lines 21. Referring to FIG. 9, a dashed line shows the boundary part T where the lead-out lines R1 to R25 extending in the column direction from the terminal part 8 start to extend in the row direction in order from the lead-out line R1.

As shown in FIGS. 9 and 10, the first width adjusting line of the lead-out line R1 includes the column-direction extending line R1_1. The second to $25^{th}$ width adjusting lines of the lead-out lines R2 to R25 include the column-direction extending lines R1_2 to R1_25 and the projecting lines R2_2 to R2_25 respectively.

The column-direction extending lines R1_1 to R1_25 have lengths W1(1) to W1(25) in the row direction respectively. The column-direction extending lines R1_1 to R1_25 are aligned and spaced from each other in the row direction by a predetermined gap (a gap with which insulation can be maintained).

The projecting lines R2_2 to R2_25 have lengths W2(2) to W2(25) in the row direction respectively. The projecting lines R2_2 to R2_25 have respective parts coupled to corresponding connections to the row-direction lines 21 (at least parts of the second to $n^{th}$ projecting lines) and these parts have lengths L2 to L25 in the column direction respectively. The lengths L2 to L25 of these parts are the same and expressed as follows: L2=L3= . . . =L25.

By increasing W2(2) to W2(25) and L2 to L25 as much as possible, the projecting lines R2_2 to R2_25 are aligned and spaced from each other in the column direction by the aforementioned predetermined gap. As a result, the lead-out lines R1 to R25 are aligned and spaced from each other in the row direction by the predetermined gap and are aligned and spaced from each other in the column direction by this predetermined gap.

In the aforementioned structure, the respective resistances of the lead-out lines R1 to R25 can be reduced in places near the input terminals 22 of the row-direction lines 21. This can reduce the respective lengths W1(1) to W1(25) in the row direction of the column-direction extending lines R1_1 to R1_25 while maintaining a resistance value in terms of the lead-out lines R1 to R25 entirely. This makes it possible to reduce the size of a frame of the touch screen 1.

FIG. 11 shows the values of the respective lengths W1(1) to W1(25) in the row direction of the column-direction extending lines R1_1 to R1_25 and those of the respective lengths W2(2) to W2(25) in the row direction of the projecting lines R2_2 to R2_25. These values are expressed in micrometers. As shown in FIG. 11, the respective lengths W1(1) to W1(25) in the row direction of the column-direction extending lines R1_1 to R1_25 are determined (adjusted) so as to satisfy the following relationship: W1(1)≤W1(2)≤ . . . ≤W1(25). The respective lengths W2(2) to W2(25) in the row direction of the projecting lines R2_2 to R2_25 are determined (adjusted) so as to satisfy the following relationship: W2(2)≤W2(3)≤ . . . ≤W2(25). By making determination (adjustment) in this way, in the second preferred embodiment, the respective resistance values of all the lead-out lines R1 to R25 become lower than the resistance value of the row-direction lines 21, as in the first preferred embodiment.

The detailed structure of the row-direction lines 21 and that of the column-direction lines 31 are the same as those of the first preferred embodiment shown in FIG. 6, so that they will not be described here. Like in the first preferred embodiment, the resistance value of the row-direction lines 21 is determined to be 780Ω in the second preferred embodiment.

The row-direction lines 21 and the column-direction lines 31 can be made of a transparent conductive material such as ITO or graphene or a metal material such as aluminum, chromium, copper, or silver. Alternatively, the row-direction lines 21 and the column-direction lines 31 may have a multilayer structure including a layer of an alloy such as aluminum, chromium, copper, or silver, and a layer for example made of aluminum nitride formed on the layer of the alloy. The width of the conductive line, a gap between the meshes, and the resistance value are not limited to those described above but can be changed, if appropriate, in a manner that depends on the purpose of use of the touch screen 1, for example.

FIG. 12 shows a result of simulation about the respective resistance values of the lead-out lines R1 to R25 in the touch screen 1 of the second preferred embodiment. In FIG. 12, a resistance value in a range from the terminal part 8 to the boundary part T and a resistance value in a range from the boundary part T to the input terminal 22 of the row-direction line 21 (resistance value of the width adjusting line) are given separately. These values are expressed in ohms.

In the touch screen 1 of the second preferred embodiment, the widths shown in FIG. 11 are applied to the width adjusting lines. In this touch screen 1, the respective resistance values of all the lead-out lines R1 to R25 become lower than 780Ω corresponding to the resistance value of the row-direction lines 21, as shown in FIG. 12. Further, in the first preferred embodiment, an overall length in the row direction about the lead-out lines R1 to R25 corresponds to a total of the lengths W(1) to W(25) of FIG. 5 (about 3082 μm). Meanwhile, in the second preferred embodiment, this overall length corresponds to the length W2(25) of FIG. 11 (2844 μm). This shows that the overall length in the row direction about the lead-out lines R1 to R25 is reduced in the second preferred embodiment.

<Effect>

To confirm the effect of the touch screen 1 according to the second preferred embodiment, the touch screen 1 of the second preferred embodiment and the touch screen 1 of the first preferred embodiment each having the transparent substrate 14 made of a glass material of a thickness of 1.0 mm were prepared and these touch screens were subjected to an electrostatic discharge test. The discharge test was conducted with a discharge capacitor set at 330 pF and a discharge resistance set at 330Ω. As a result of the test, breakdown was recognized in a place near a connection between the lead-out line R25 and the input terminal 22 of the row-direction line 21 in the touch screen 1 of the first preferred embodiment in the presence of discharge of about 18 kV. In contrast, in the touch screen 1 of the second preferred embodiment, breakdown was not recognized even in the presence of discharge exceeding 18 kV.

As described above, according to the second preferred embodiment, breakdown is unlikely to be caused by electrostatic discharge for example from a conductor on a touch panel, making it possible to achieve a highly-reliable touch screen. Additionally, the touch screen 1 of the second preferred embodiment and the touch screen 1 of the first preferred embodiment were compared in terms of a maximum width (frame) in the row direction occupied by the lead-out lines R1 to R25. This maximum width is 3.33 mm in the touch screen 1 of the first preferred embodiment and is 3.09 mm in the touch screen 1 of the second preferred embodiment, meaning that the maximum width can be reduced in the touch screen 1 of the second preferred embodiment. In this way, according to the second preferred embodiment, the touch screen 1 is allowed to narrow a frame of a touch panel.

According to the second preferred embodiment, the lengths L2 to Ln in the column direction of at least parts of the projecting lines R2_2 to R2_n respectively are the same. This generates a parasitic capacitance between the row-direction line 21 and a lead-out line that is determined uniformly among a plurality of lead-out lines. Thus, malfunction due to a deviation in capacitance is unlikely to occur.

In the description given above, the second to $25^{th}$ width adjusting lines targeted for width adjustment include not only the column-direction extending lines R1_2 to R1_25 but also the projecting lines R2_2 to R2_25 respectively and the respective widths of all these lines are adjusted. Alternatively, the second to $25^{th}$ width adjusting lines may include only the column-direction extending lines R1_2 to R1_25 respectively and only the respective widths of these lines may be adjusted. This structure can still achieve effect comparable to the aforementioned effect.

<Third Preferred Embodiment>

A third preferred embodiment of the present invention differs from the first and second preferred embodiments in that many projecting lines each include a projecting portion line projecting in stages toward a detectable area. The overall structure of a touch screen 1 according to the third preferred embodiment and that of lead-out lines including the lead-out lines R1 to R25 are the same as those of the first preferred embodiment shown in FIGS. 1 and 2, so that they will not be described here.

Figure 13:
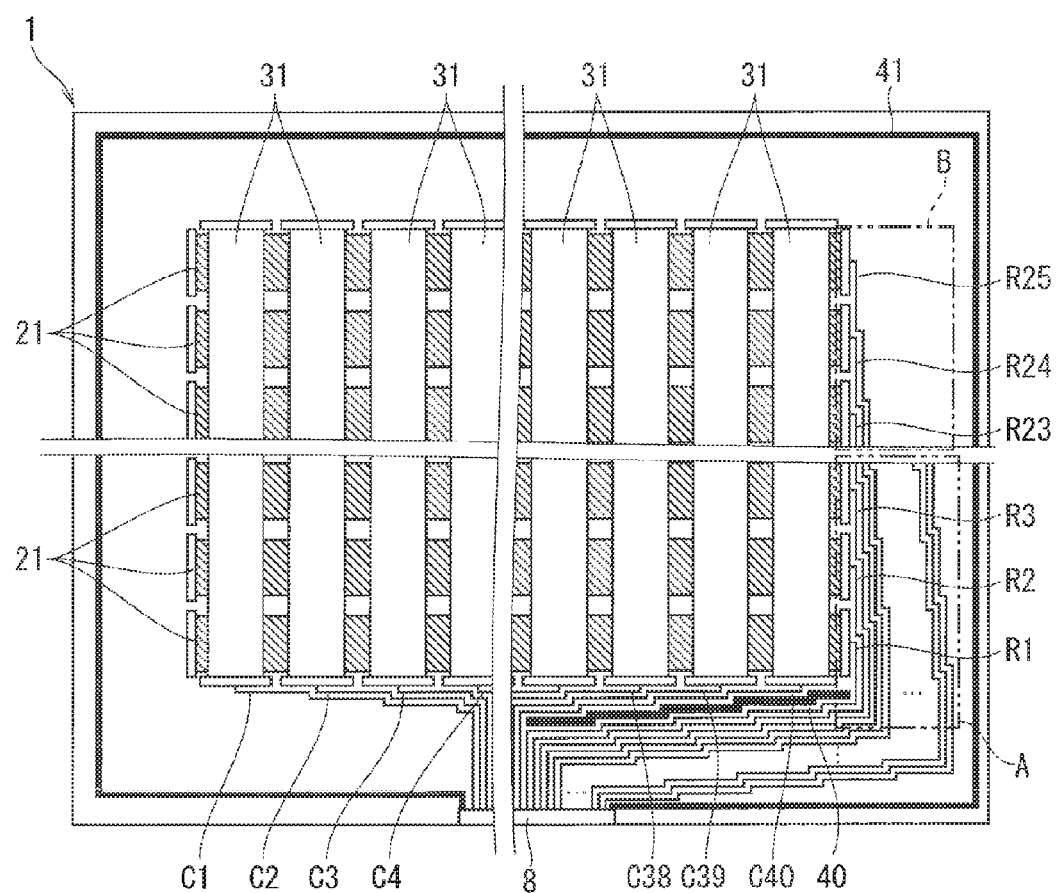

FIG. 13 is a plan view showing the structure of the touch screen 1 according to the third preferred embodiment. A detectable area is a matrix area formed of a plurality of row-direction lines 21 extending in the row direction (X direction or horizontal direction) while being aligned in the column direction (Y direction or vertical direction) and a plurality of column-direction lines 31 extending in the column direction while being aligned in the row direction overlapping each other in a plan view.

The lead-out lines R1 to R25 connect the terminal parts 8 and the row-direction lines 21 to each other electrically. Likewise, the lead-out lines C1 to C40 connect the terminal parts 8 and the column-direction lines 31 to each other electrically.

The lead-out lines R1 to R25 and the lead-out lines C1 to C40 are placed along the outer periphery of the detectable area. The respective total lengths of the lead-out lines R1 to R25 are increased in this order. The shield line 40 receiving a reference potential such as a ground potential is placed between the lead-out line C40 for the column-direction line 31 and the lead-out line R1 for the row-direction line 21. Placing the shield line 40 can reduce a cross-capacitance between the lead-out lines C40 and R1. This can make it unlikely that a touch with an indicator will be detected erroneously.

The lead-out line R1 is placed along the outer periphery of the detectable area. A major part of the lead-out line R2 is placed along the lead-out line R1. Meanwhile, in a range from a position where the lead-out line R1 is connected to the input terminal 22 of one row-direction line 21 to a position where the lead-out line R2 is connected to the input terminal 22 of a next row-direction line 21, the lead-out line R2 is placed along the outer periphery of the detectable area. The lead-out lines R3 to R25 are configured in the same manner, so that the lead-out lines R1 to R25 are aligned tightly in such a manner as to be closer to the outer periphery of the detectable area in order of increasing distance from the terminal part 8. Likewise, the lead-out lines C1 to C40 are aligned tightly in such a manner as to be closer to the outer periphery of the detectable area in order of increasing distance from the terminal part 8.

In this way, the lead-out lines R1 to R25 and the lead-out lines C1 to C40 are both aligned in such a manner as to be closer to the outer periphery of the detectable area as tightly as possible. This can reduce a fringe capacitance between the display element 51 (FIG. 1) to which the touch screen 1 is attached and each of the lead-out lines R1 to R24 and each of the lead-out lines C2 to C40 except the outermost lead-out lines R25 and C1.

In the third preferred embodiment, an outermost shield line 41 is placed outside the outermost lead-out lines R25 and C1 so as to surround the row-direction lines 21, the column-direction lines 31, and the lead-out lines R1 to R25 and C1 to C40. The shield line 41 receives a ground potential. This can reduce a fringe capacitance between the display element 51 (FIG. 1) and each of the outermost lead-out lines R25 and C1. In the third preferred embodiment, the lead-out lines R1 to R25 are evenly spaced from each other.

Figure 14:
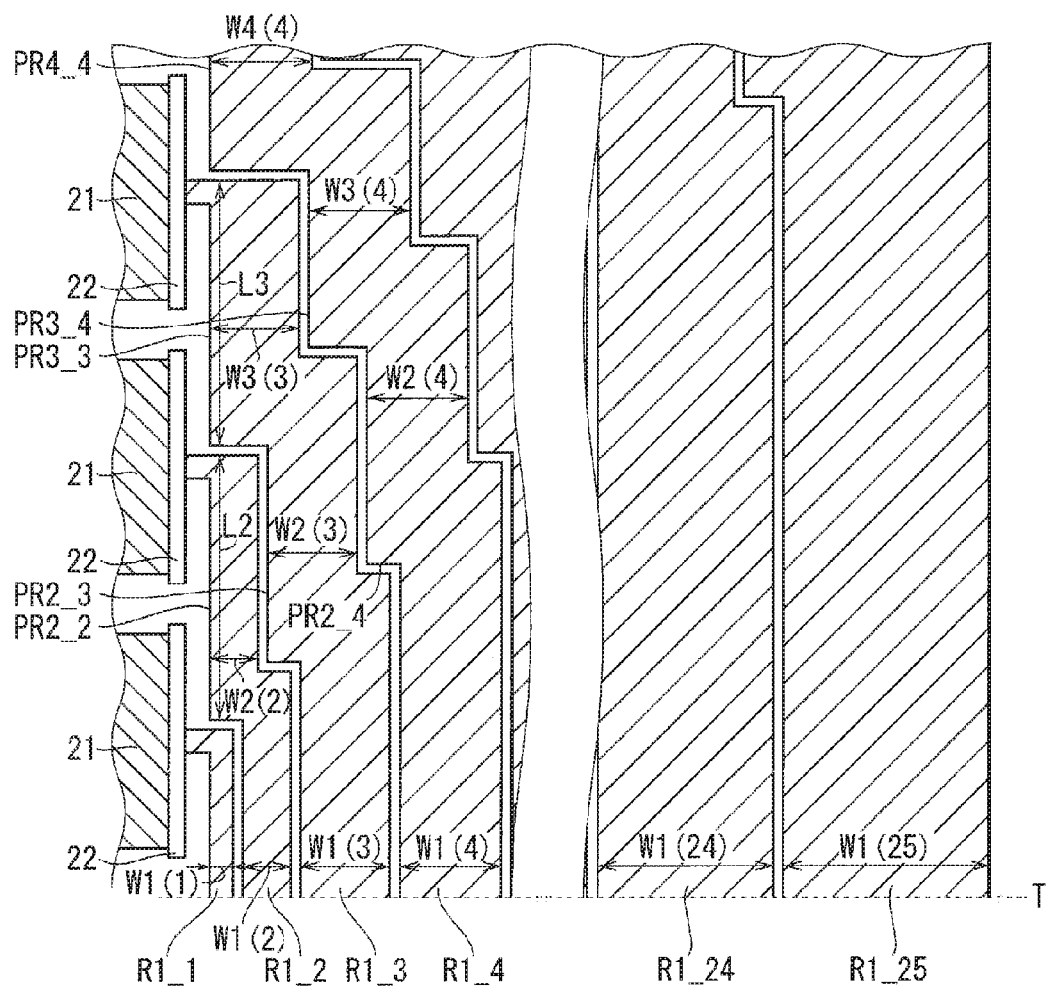

The structure of each of the lead-out lines R1 to R25 is described in detail next using FIGS. 14 and 15. FIG. 14 is a plan view showing a region A shown in FIG. 13 and its neighboring region in an enlarged manner where the lead-out lines R1 to R3 are connected to the respective input terminals 22 of the row-direction lines 21. FIG. 15 is a plan view showing a region B shown in FIG. 13 and its neighboring region in an enlarged manner where the lead-out lines R23 to R25 are connected to the respective input terminals 22 of the row-direction lines 21. Referring to FIG. 14, a dashed line shows the boundary part T where the lead-out lines R1 to R25 extending in the column direction from the terminal part 8 start to extend in the row direction in order from the lead-out line R1.

As shown in FIGS. 14 and 15, the first width adjusting line of the lead-out line R1 includes the column-direction extending line R1_1. The second to $25^{th}$ width adjusting lines of the lead-out lines R2 to R25 include the column-direction extending lines R1_2 to R1_25 and second to $25^{th}$ projecting lines respectively not indicated by signs in FIGS. 14 and 15.

The column-direction extending lines R1_1 to R1_25 have lengths W1(1) to W1(25) in the row direction respectively. The column-direction extending lines R1_1 to R1_25 are aligned and spaced from each other in the row direction by a predetermined gap (a gap with which insulation can be maintained).

A $k^{th}$ projecting line (k=2, 3, . . . , 25) arbitrarily selected from the second to $25^{th}$ projecting lines includes projecting portion lines in number (k−1) including PR2_k, PR3_k, . . . , PRk_k projecting in stages toward the detectable area. As one example, the second projecting line includes one projecting portion line PR2_2 projecting in one stage toward the detectable area. As another example, the $25^{th}$ projecting line includes 24 projecting portion lines PR2_25, PR3_25, PR25_25 projecting in 24 stages toward the detectable area.

A $k^{th}$ column-direction extending line R1_k (k=2, 3, ..., 25) arbitrarily selected from the column-direction extending lines R1_2 to R1_25 is connected to a projecting portion line PR2_k projecting further than the $k^{th}$ column-direction extending line R1_k. The projecting portion line PR2_k is connected to a projecting portion line PR3_k projecting further than the projecting portion line PR2_k. Finally, a projecting portion line PR(k−1)_k is connected to a projecting portion line PRk_k projecting further than the projecting portion line PR(k−1)_k. Specifically, the projecting portion lines PR2_k, PR3_k, PRk_k are connected in this order to the column-direction extending line R1_k and project in stages in this order toward the detectable area.

In particular, except the outermost $25^{th}$ projecting line, the arbitrary $k^{th}$ projecting line (k=2, 3, ..., 24) includes the projecting portion lines PR2_k, PR3_k, PRk_k as lines extending in the column direction. One end of the $k^{th}$ column-direction extending line R1_k in a part closer to the detectable area is connected to one end of the projecting portion lines PR2_k. An opposite end of the projecting portion lines PR2_k in a part closer to the detectable area is connected to one end of the projecting portion lines PR3_k. Finally, an opposite end of the projecting portion lines PR(k−1)_k in a part closer to the detectable area is connected to one end of the projecting portion lines PRk_k.

The lead-out lines R2 to R24 of the aforementioned structures get closer to the input terminals 22 of the row-direction lines 21 while being bent. Compared to the second preferred embodiment, this reduces a shortest distance of a current path from the boundary part T. In this way, a resistance value is reduced, so that the size of a frame of the touch screen 1 can also be reduced.

The projecting portion lines PR2_k, PR3_k, PRk_k have lengths W2(k), W3(k), ..., Wk(k) respectively. Some of these lengths including W2(2), W2(3), W3(3), W2(4), W3(4), W4(4), ..., W25(25) are shown in FIGS. 14 and 15. A slit width between an $mk^{th}$ projecting portion line PRmk_k−1 being a part of a $(k−1)^{th}$ projecting line and an $mk^{th}$ projecting portion line PRmk_k being a part of the $k^{th}$ projecting line is Sk−1_k(mk). FIG. 15 shows a slit width S23_24(23) between a $23^{rd}$ projecting portion line PR23_23 being a part of the $23^{rd}$ projecting line and a $23^{rd}$ projecting portion line PR23_24 being a part of the $24^{th}$ projecting line. FIG. 15 also shows a slit width S24_25(23) between the $23^{rd}$ projecting portion line PR23_24 being a part of the $24^{rd}$ projecting line and a $23^{rd}$ projecting portion line PR23_25 being a part of the $25^{th}$ projecting line.

In the third preferred embodiment, by determining (adjusting) the respective widths of the width adjusting lines in the aforementioned way, the respective lengths in the row direction of two or more of the column-direction extending lines R1_1 to R1_25 differ from each other and the respective lengths in the row direction of two or more projecting portion lines projecting in the same stage differ from each other. Further, as will be described later by referring to FIG. 16, the following relationship is established:

$$W1(1)+W1(2)+ \ldots +W1(n)+S1\_2(1)+S2\_3(1)+ \ldots +Sn-1\_n(1) \geq W2(2)+W2(3)+ \ldots +W2(n)+S2\_3(2)+S3\_4(2)+ \ldots +Sn-1\_n(2) \geq \ldots \geq Wn-1(n-1)+Wn-1(n)+Sn-1\_n(n-1) \geq Wn(n).$$

The projecting portion lines PR2_2, PR3_3, PR25_25 have respective parts coupled to corresponding connections to the row-direction lines 21 (at least parts of the second to $n^{th}$ projecting lines) and these parts have lengths L2 to L25 in the column direction respectively. The lengths L2 to L25 of these parts are the same and expressed as follows: L2=L3= ... =L25.

By increasing W2(2), W2(3), W3(3), W2(4), W3(4), W4(4), ..., Wn(n) and L2 to L25 as much as possible, the second to $25^{th}$ projecting lines are aligned and spaced from each other in the column direction or in the row direction by the aforementioned predetermined gap. As a result, the lead-out lines R1 to R25 are aligned and spaced from each other in the row direction by the predetermined gap and are aligned and spaced from each other in the column direction by this predetermined gap.

In the aforementioned structure, the respective resistances of the lead-out lines R1 to R25 can be reduced. This can reduce the respective lengths W1(1) to W1(25) in the row direction of the column-direction extending lines R1_1 to R1_25 while maintaining a resistance value in terms of the lead-out lines R1 to R25 entirely. This makes it possible to reduce the size of a frame of the touch screen 1.

FIG. 16 shows the values of the respective lengths W1(1) to W1(25) in the row direction of the column-direction extending lines R1_1 to R1_25 and those of the respective lengths W2(2), W2(3), ..., W25(25) in the row direction of the projecting portion lines PR2_2, PR2_3, PR25_25. These values are expressed in micrometers.

The respective lengths W1(1) to W1(25) of the column-direction extending lines R1_1 to R1_25 substantially differ from each other. Further, lengths Wi+1(i+1), Wi+1(i+2), Wi+1(25) of projecting portion lines projecting in an $i^{th}$ stage substantially differ from each other.

In FIG. 16, the following relationship is established as one example of the aforementioned inequality: W1(1)+W1(2)+ ... +W1(25)+S1_2(1)+S2_3(1)+ ... S24_25(1)= ... =W24(24)+W24(25)+S24_25(24)=W25(25). The values of FIG. 16 are rounded-off values. Thus, in some cases, this equality may not hold true if the values of FIG. 16 are plugged in this formula.

Values shown as averages in FIG. 16 include the length of the lead-out line R1 (W1(1)), an average (W1(2)+W2(2)/2) of the length of the lead-out line R2, ..., and an average (W1(25)+W2(25)+ ... +W25(25)/25) of the lead-out line R25. These averages show that the respective lengths in the row direction of the lead-out lines R1 to R25 are increased substantially in this order.

Like in the first preferred embodiment, by making determination (adjustment) in the aforementioned way in the third preferred embodiment, the respective resistance values of all the lead-out lines R1 to R25 become lower than the resistance value of the row-direction lines 21.

The detailed structure of the row-direction lines 21 and that of the column-direction lines 31 are the same as those of the first preferred embodiment shown in FIG. 6, so that they will not be described here. Like in the first preferred embodiment, the resistance value of the row-direction lines 21 is determined to be 780Ω in the third preferred embodiment.

The row-direction lines 21 and the column-direction lines 31 can be made of a transparent conductive material such as ITO or graphene or a metal material such as aluminum, chromium, copper, or silver. Alternatively, the row-direction lines 21 and the column-direction lines 31 may have a multilayer structure including a layer of an alloy such as aluminum, chromium, copper, or silver, and a layer for example made of aluminum nitride formed on the layer of the alloy. The width of the conductive line, a gap between the meshes, and the resistance value are not limited to those described above but can be changed, if appropriate, in a manner that depends on the purpose of use of the touch screen 1, for example.

FIG. 17 shows a result of simulation about the respective resistance values of the lead-out lines R1 to R25 in the touch screen 1 of the third preferred embodiment. In FIG. 17, a resistance value in a range from the terminal part 8 to the boundary part T and a resistance value in a range from the boundary part T to the input terminal 22 of the row-direction line 21 (resistance value of the width adjusting line) are given separately. These values are expressed in ohms.

In the touch screen 1 of the third preferred embodiment, the widths shown in FIG. 16 are applied to the width adjusting lines. In this touch screen 1, the respective resistance values of all the lead-out lines R1 to R25 become lower than 780Ω corresponding to the resistance value of the row-direction lines 21, as shown in FIG. 17. Further, in the second preferred embodiment, an overall length in the row direction about the lead-out lines R1 to R25 corresponds to the length W2(25) of FIG. 11 (2844 μm). Meanwhile, in the third preferred embodiment, this overall length corresponds to the length W2(25) of FIG. 17 (2310 μm). This shows that the overall length in the row direction about the lead-out lines R1 to R25 is reduced further in the third preferred embodiment.

<Effect>

To confirm the effect of the touch screen 1 according to the third preferred embodiment, the touch screen 1 of the third preferred embodiment and the touch screen 1 of the first preferred embodiment each having the transparent substrate 14 made of a glass material of a thickness of 1.0 mm were prepared and these touch screens were subjected to an electrostatic discharge test. The discharge test was conducted with a discharge capacitor set at 330 pF and a discharge resistance set at 330Ω. As a result of the test, breakdown was recognized in a place near a connection between the lead-out line R25 and the input terminal 22 of the row-direction line 21 in the touch screen 1 of the first preferred embodiment in the presence of discharge of about 18 kV. In contrast, in the touch screen 1 of the third preferred embodiment, breakdown was not recognized even in the presence of discharge exceeding 18 kV.

As described above, according to the third preferred embodiment, breakdown is unlikely to be caused by electrostatic discharge for example from a conductor on a touch panel, making it possible to achieve a highly-reliable touch screen. Additionally, the touch screen 1 of the third preferred embodiment and the touch screen 1 of the second preferred embodiment were compared in terms of a maximum width (frame) in the row direction occupied by the lead-out lines R1 to R25. This maximum width is 3.09 mm in the touch screen 1 of the second preferred embodiment and is 2.56 mm in the touch screen 1 of the third preferred embodiment, meaning that the maximum width can be reduced in the touch screen 1 of the third preferred embodiment. In this way, according to the third preferred embodiment, the touch screen 1 is allowed to narrow a frame of a touch panel.

<Modifications of First to Third Preferred Embodiments>

Figure 18:
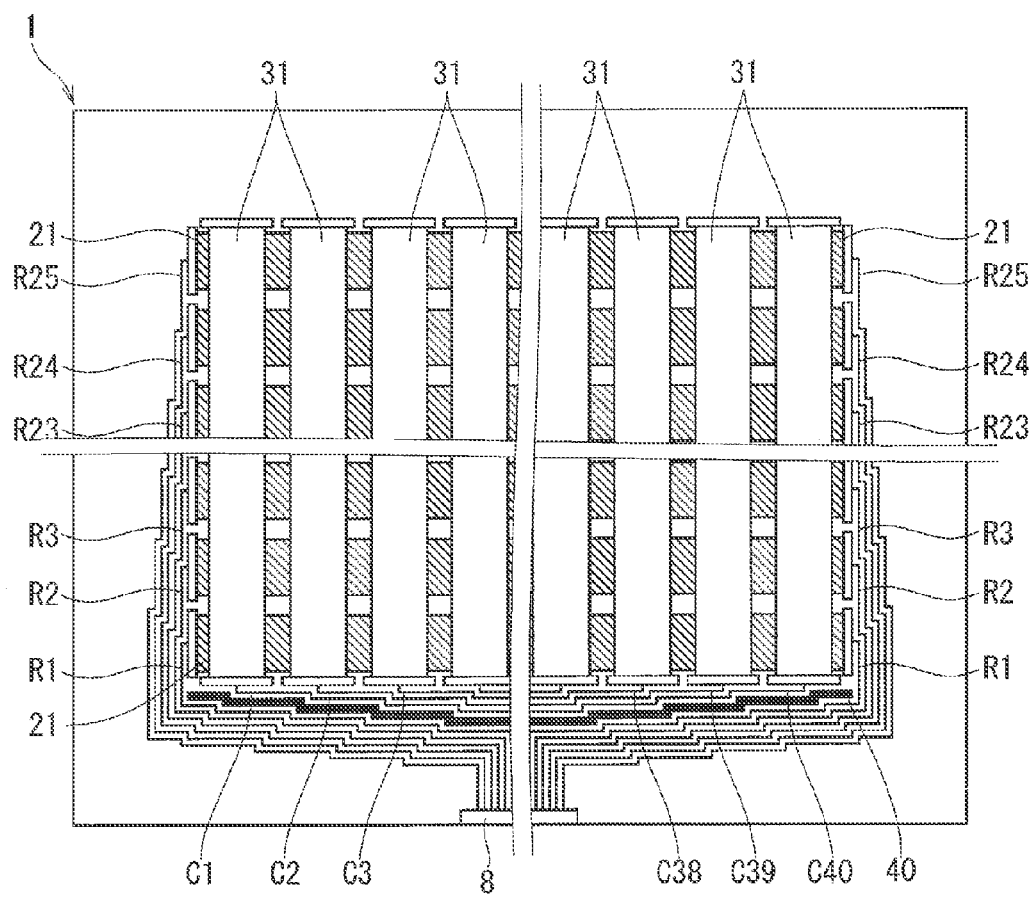
FIG. 18 is a plan view showing the structure of a touch screen according to a modification of the first to third preferred embodiments.

In the aforementioned first to third preferred embodiments, a lead-out line is connected to the row-direction line 21 at one end of this row-direction line 21. Alternatively, the lead-out line may be connected to the row-direction line 21 at one end and another end of this row-direction line 21. In the illustration of FIG. 18, each of the lead-out lines R1 to R25 is connected to the row-direction line 21 at both of right and left ends of this row-direction line 21. In this case, a load including the resistance and the capacitance of the row-direction line 21 can be reduced effectively, so that detection speed can be increased.

Figure 19:
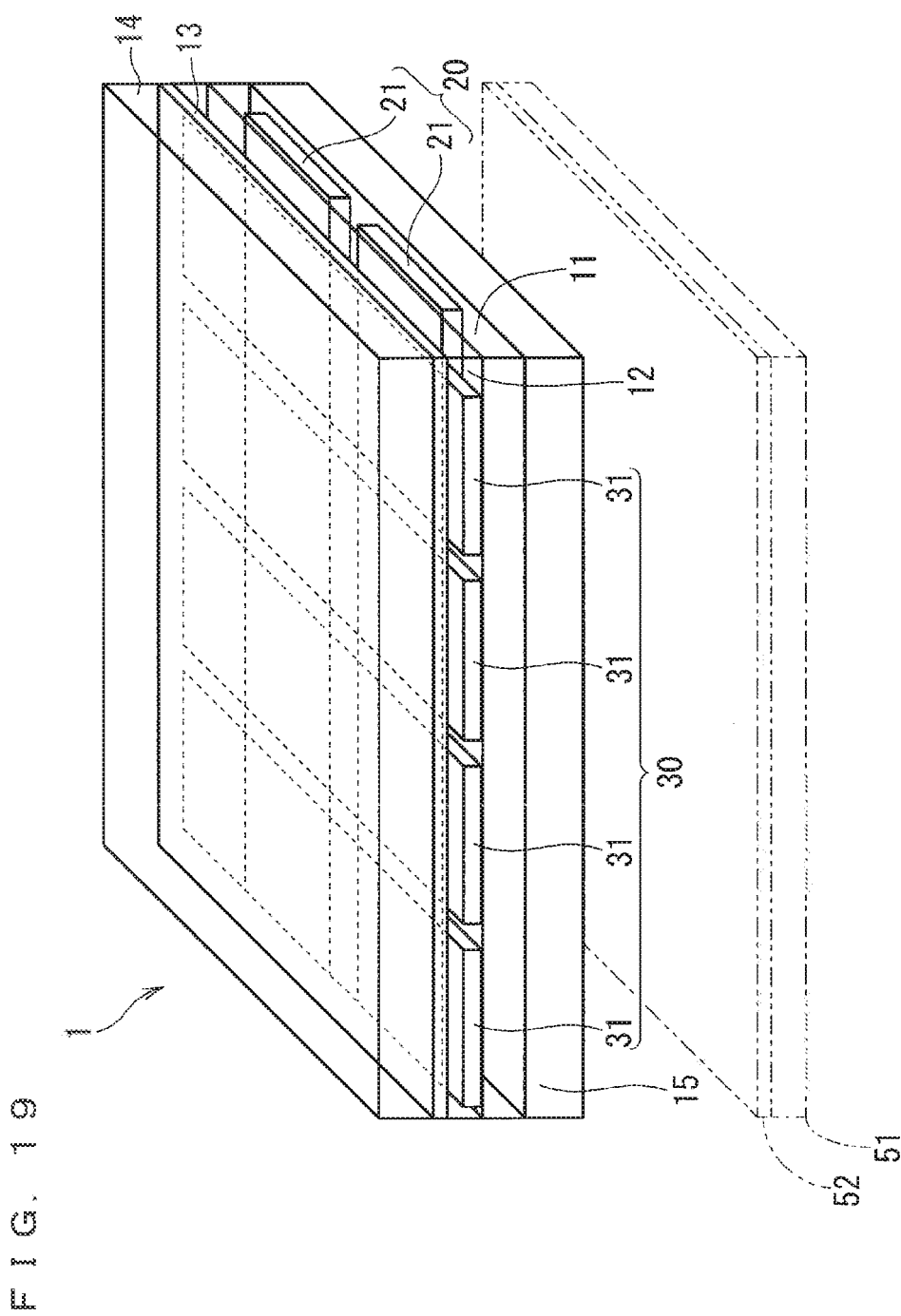
FIG. 19 is a perspective view showing a layer structure of a touch screen according to a modification of the first to third preferred embodiments.

In the first and third preferred embodiments, a color filter substrate of a liquid crystal display may be provided instead of the transparent substrate 10 shown in FIG. 1. FIG. 19 is a perspective view showing a layer structure of a touch screen 1. In the illustration of FIG. 19, the lower electrode 20, the interlayer insulating film 11, the upper electrode 30, and the protection film 12 are formed in order over the display surface of the color filter substrate 15. The transparent substrate 14 made of a transparent glass material or transparent resin is provided on the upper surface of the protection film 12. In this case, the color filter substrate 15 of the liquid crystal display (display element 51) can also be used as the transparent substrate 10 of the touch screen 1. This achieves thickness reduction of a structure including the liquid crystal display and the touch screen 1 attached to the liquid crystal display.

In the description of the first to third preferred embodiments, the detectable area corresponds to an active area (predetermined area), the row-direction lines 21 correspond to a plurality of area lines, and the touch screen 1 corresponds to a planar device. Alternatively, a display area may correspond to the active area (predetermined area) and a liquid crystal display formed of a TFT array including a plurality of thin film transistors connected to a plurality of area lines (source line and gate line) in the display area may correspond to the planar device. Like in the aforementioned touch screen 1, in this liquid crystal display, the probability of the occurrence of breakdown due to ESD can be reduced and display unevenness due to the insufficiently charged state of the TFTs is expected to be alleviated.

The preferred embodiments and the modifications of the present invention can be combined freely within the scope of the invention. Further, each of the preferred embodiments and each of the modifications can be changed or omitted, where appropriate.

While the invention has been shown and described in detail, the foregoing description is in all aspects illustrative and not restrictive. It is therefore understood that numerous modifications and variations can be devised without departing from the scope of the invention.

What is claimed is:

1. A planar device having a line placed along a plane, comprising:
  a plurality of area lines extending in a first direction while being aligned in a second direction perpendicular to said first direction in a predetermined area;
  a plurality of terminal parts provided outside said predetermined area; and
  a plurality of lead-out lines electrically connecting said terminal parts and said area lines to each other, wherein
  each of said plurality of lead-out lines includes a width adjusting line determined to have a width different from the widths of the other lead-out lines to make the respective resistance values of all of said lead-out lines lower than the resistance value of said area lines.

2. The planar device according to claim 1, wherein
  first to $n^{th}$ lead-out lines (n is an integer of two or more) belonging to said lead-out lines include first to $n^{th}$ width adjusting lines respectively belonging to said width adjusting lines,
  said first to $n^{th}$ width adjusting lines include first to $n^{th}$ second-direction extending lines respectively extending in said second direction while being aligned in said first direction in order of increasing distance from said predetermined area, and by determining said width adjusting lines to have said widths, the respective widths of said first to $n^{th}$ width adjusting lines are increased in this order.

3. The planar device according to claim 1, wherein said lead-out lines are aligned and spaced from each other in said first direction by a predetermined gap and are aligned and spaced from each other in said second direction by said predetermined gap.

4. The planar device according to claim 1, wherein first to $n^{th}$ lead-out lines (n is an integer of two or more) belonging to said lead-out lines include first to $n^{th}$ width adjusting lines respectively belonging to said width adjusting lines, said first to $n^{th}$ width adjusting lines include first to $n^{th}$ second-direction extending lines respectively extending in said second direction while being aligned in said first direction in order of increasing distance from said predetermined area, said second to $n^{th}$ width adjusting lines further include second to $n^{th}$ projecting lines respectively that electrically connect said area lines and said second to $n^{th}$ second-direction extending lines and project further toward said predetermined area in said first direction than the connected second to $n^{th}$ second-direction extending lines respectively, a $k^{th}$ projecting line arbitrarily selected from said second to $n^{th}$ projecting lines includes projecting portion lines in number (k−1) projecting in stages toward said predetermined area, and by determining said width adjusting lines to have said widths, the lengths in said first direction of two or more of said second-direction extending lines differ from each other while the lengths in said first direction of two or more of said projecting portion lines projecting in the same stage differ from each other.

5. The planar device according to claim 4, wherein the following relationship is established:

$$W1(1)+W1(2)+ \ldots +W1(n)+S1\_2(1)+S2\_3(1)+ \ldots +Sn-1\_n(1) \geq W2(2)+W2(3)+ \ldots +W2(n)+S2\_3(2)+S3\_4(2)+ \ldots +Sn-1\_n(2) \geq \ldots \geq Wn-1(n-1)+Wn-1(n)+Sn-1\_n(n-1) \geq Wn(n),$$

where $W1(1)$ to $W1(n)$ are the lengths in said first direction of said first to $n^{th}$ second-direction extending lines respectively, $W2(k), W3(k), \ldots, Wk(k)$ are the lengths in said first direction of said projecting portion lines in number (k−1) of said $k^{th}$ projecting line given in order in which said projecting portion lines in number (k−1) start to project, and $Sk-1\_k(mk)$ is a slit width between an $mk^{th}$ projecting portion line being a part of a $(k-1)^{th}$ projecting line and an $mk^{th}$ projecting portion line being a part of said $k^{th}$ projecting line.

6. The planar device according to claim 4, wherein said lead-out lines are aligned and spaced from each other in said first direction by a predetermined gap and are aligned and spaced from each other in said second direction by said predetermined gap.

7. The planar device according to claim 1, wherein first to $n^{th}$ lead-out lines (n is an integer of two or more) belonging to said lead-out lines include first to $n^{th}$ width adjusting lines respectively belonging to said width adjusting lines, said first to $n^{th}$ width adjusting lines include first to $n^{th}$ second-direction extending lines respectively extending in said second direction while being aligned in said first direction in order of increasing distance from said predetermined area, said second to $n^{th}$ width adjusting lines further include second to $n^{th}$ projecting lines respectively that electrically connect said area lines and said second to $n^{th}$ second-direction extending lines and project further toward said predetermined area in said first direction than the connected second to $n^{th}$ second-direction extending lines respectively, and at least parts of said second to $n^{th}$ projecting lines have the same length in said second direction.

8. A touch screen comprising a planar device having a line placed along a plane, wherein said planar device comprises:

a plurality of area lines extending in a first direction while being aligned in a second direction perpendicular to said first direction in a predetermined area;

a plurality of terminal parts provided outside said predetermined area; and a plurality of lead-out lines electrically connecting said terminal parts and said area lines to each other, each of said plurality of lead-out lines includes a width adjusting line determined to have a width different from the widths of the other lead-out lines to make the respective resistance values of all of said lead-out lines lower than the resistance value of said area lines, said predetermined area is a detectable area, and said area lines are a plurality of sensor lines.

9. The touch screen according to claim 8, wherein each of said sensor lines includes a metal line in a mesh pattern.

10. A liquid crystal display comprising:

a planar device having a line placed along a plane; and a plurality of thin film transistors, wherein said planar device comprises:

a plurality of area lines extending in a first direction while being aligned in a second direction perpendicular to said first direction in a predetermined area;

a plurality of terminal parts provided outside said predetermined area; and a plurality of lead-out lines electrically connecting said terminal parts and said area lines to each other, each of said plurality of lead-out lines includes a width adjusting line determined to have a width different from the widths of the other lead-out lines to make the respective resistance values of all of said lead-out lines lower than the resistance value of said area lines, said predetermined area is a display area, and said thin film transistors are connected to said area lines in said display area.

* * * * *